United States Patent
Kim et al.

(10) Patent No.: US 11,956,657 B2
(45) Date of Patent: Apr. 9, 2024

(54) METHOD AND APPARATUS FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Seonwook Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/806,584

(22) Filed: Jun. 13, 2022

(65) Prior Publication Data

US 2022/0322118 A1 Oct. 6, 2022

Related U.S. Application Data

(63) Continuation of application No. PCT/KR2021/001913, filed on Feb. 15, 2021.
(Continued)

(30) Foreign Application Priority Data

Feb. 13, 2020 (KR) .................... 10-2020-0017368

(51) Int. Cl.
*H04W 24/08* (2009.01)
*H04L 27/26* (2006.01)
(Continued)

(52) U.S. Cl.
CPC ....... *H04W 24/08* (2013.01); *H04L 27/26025* (2021.01); *H04W 72/042* (2013.01); *H04W 72/0446* (2013.01)

(58) Field of Classification Search
CPC ............... H04W 24/08; H04W 72/042; H04W 72/0446; H04L 27/26025
See application file for complete search history.

(56) References Cited

U.S. PATENT DOCUMENTS

| 2014/0211717 A1 | 7/2014 | Jitsukawa |
| 2019/0357238 A1 | 11/2019 | Zhou et al. |

FOREIGN PATENT DOCUMENTS

| CN | 104641582 | 5/2015 |
| CN | 104782067 | 7/2015 |

(Continued)

OTHER PUBLICATIONS

3GPP TS 38.213 v16.0.0 (Dec. 2019), 3rd Generation Partnership Project: Technical Specification Group Radio Access Network; NR; Physical layer procedures for control (Release 16), pp. 1-146. (Year: 2019).*

(Continued)

*Primary Examiner* — Melvin C Marcelo
(74) *Attorney, Agent, or Firm* — LEE, HONG, DEGERMAN, KANG & WAIMEY

(57) ABSTRACT

The present invention relates to a wireless communication system, and specifically, to: a method comprising a step in which first PDCCH monitoring is performed in a first SS set group within a cell group configured for an SS set group switching operation, and a step in which, from a $1^{st}$ slot coming at least P symbols after a reference time, the first PDCCH monitoring is stopped in the first SS set group and second PDCCH monitoring is started in a second SS set group for cells in the cell group, wherein the numerology of the P symbols is determined as a cell group-common value on the basis of the smallest SCS among a plurality of SCSs on the basis of the plurality of SCSs being configured for the cell group; and an apparatus for same.

6 Claims, 19 Drawing Sheets

Related U.S. Application Data

(60) Provisional application No. 63/030,239, filed on May 26, 2020, provisional application No. 63/029,545, filed on May 24, 2020.

(51) Int. Cl.
    *H04W 72/04*     (2023.01)
    *H04W 72/0446*     (2023.01)

(56) References Cited

FOREIGN PATENT DOCUMENTS

| | | |
|---|---|---|
| CN | 105229938 | 1/2016 |
| JP | 2023525188 | 6/2023 |
| KR | 10-2012-0068968 | 6/2012 |
| WO | 2017-151876 | 9/2017 |
| WO | 2018199653 | 11/2018 |
| WO | 2019-122518 | 6/2019 |
| WO | 2021189367 | 9/2021 |

OTHER PUBLICATIONS

R1-2003180, 3GPP TSG-RAN WG1 Meeting #100bis-3, Apr. 20-30, 2020, 'Corrections on shared spectrum channel access', Samsung, pp. 1-21. (Year: 2020).*

PCT International Application No. PCT/KR2021/001913, International Search Report dated Jun. 9, 2021, 3 pages.

European Patent Office Application Serial No. 21754266.1, Search Report dated Jun. 26, 2023, 9 pages.

Japan Patent Office Application No. 2022-548719, Office Action dated Jul. 18, 2023, 8 pages.

The State Intellectual Property Office of the People's Republic of China Application Serial No. 202180011246.7, Office Action dated Jul. 27, 2023, 7 pages.

Qualcomm, "NR-based Access to Unlicensed Spectrum", 3GPP TSG RAN meeting #86, RP-193063, XP051838794, Dec. 2019, 57 pages.

Samsung, "Introduction of shared spectrum channel access", 3GPP TSG RAN Meeting #86, RP-193122, XP051838949, Dec. 2019, 44 pages.

Oppo, "Discussion on the remaining issues of DL signals and channels", 3GPP TSG RAN WG1 #100bis-E, R1-2001757, 8 pages, Apr. 20-May 1, 2020.

Apple Inc., "Remaining issues of DL signals and channels", 3GPP TSG-RAN WG1 #100b-eMeeting, R1-2002320, Apr. 2020, 5 pages.

Moderator (Lenovo), "Summary #2 of email discussion [101-e-NR-unlic-NRU-DL_Signals_and_Channels-01] on Search Space", 3GPP TSG RAN WG1#101-e, R1-2005011, Jun. 2020, 28 pages.

Moderator (Lenovo), "Summary of email discussion [102-e-NR-unlic-NRU-DL_Signals_and_Channels-02] on Search Space and CSI-RS", 3GPP TSG RAN WG1#102-e, R1-2007144, Aug. 2020, 31 pages.

Nian, "Key Techniques and Performance of PDCCH Channel for Broadband Wireless Trunking System", University of Electronic Science and Technology of China, (C)1994-2022 74 pages.

Qualcomm, "NR-based Access to Unlicensed Spectrum", 3GPP TSG RAN meeting #86, RP-193063, Dec. 2019, 57 pages.

Korean Intellectual Property Office Application No. 10-2022-7007102, Office Action dated Oct. 23, 2023, 4 pages.

Qualcomm Incorporated, "DL signals and channels for NR-U", R1-1912936, 3GPP TSG RAN WG1 Meeting #98bis, Nov. 2019, 16 pages.

Nokia, Nokia Shanghai Bell, "On half-duplex operation in CA", R1-1913440, 3GPP TSG-RAN WG1 Meeting #99, Nov. 2019, 5 pages.

\* cited by examiner

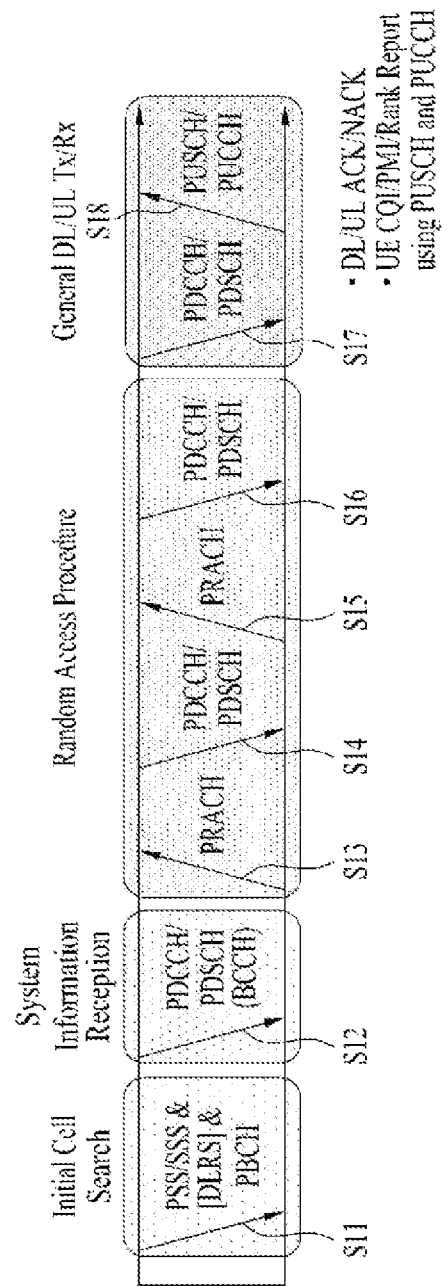
[FIG. 1]

[FIG. 2]
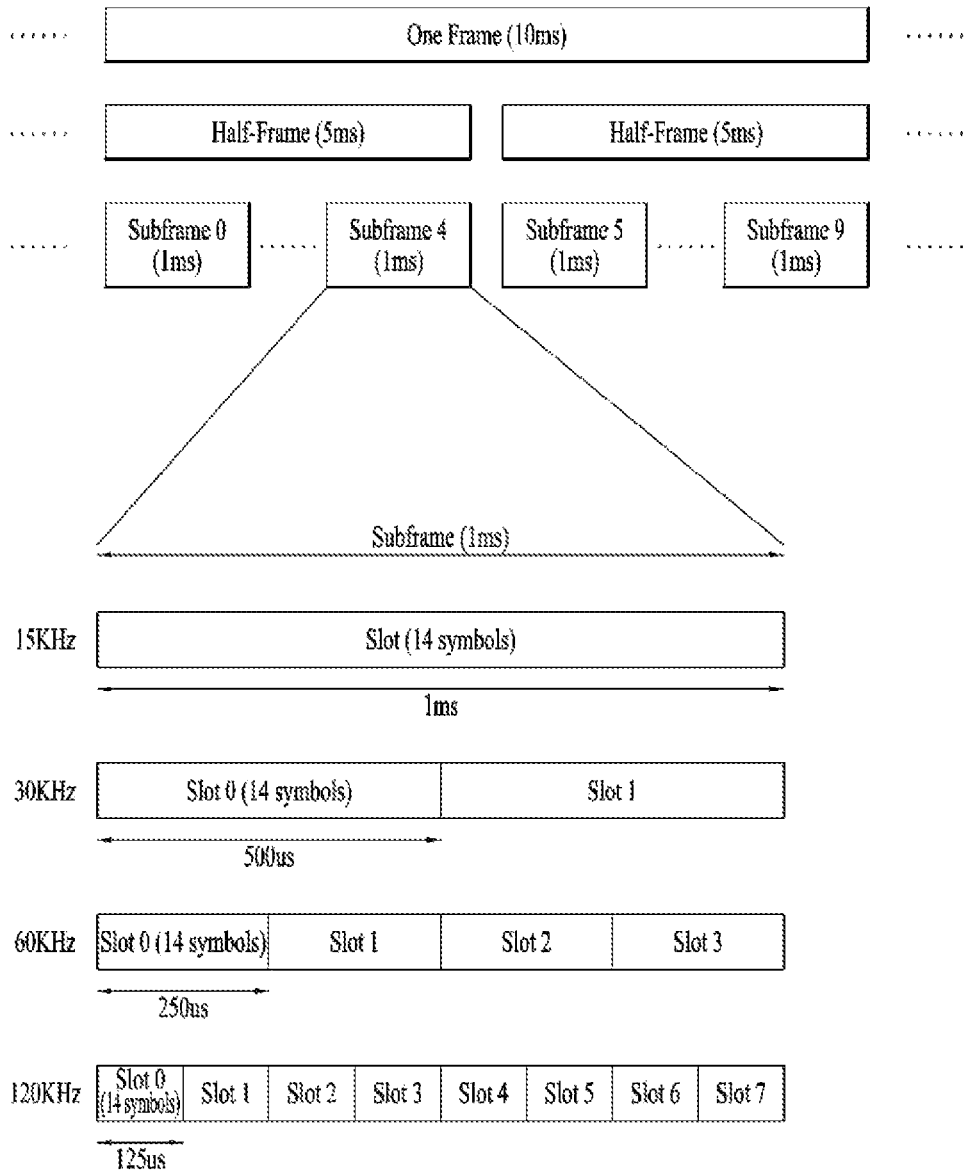

[FIG. 3]
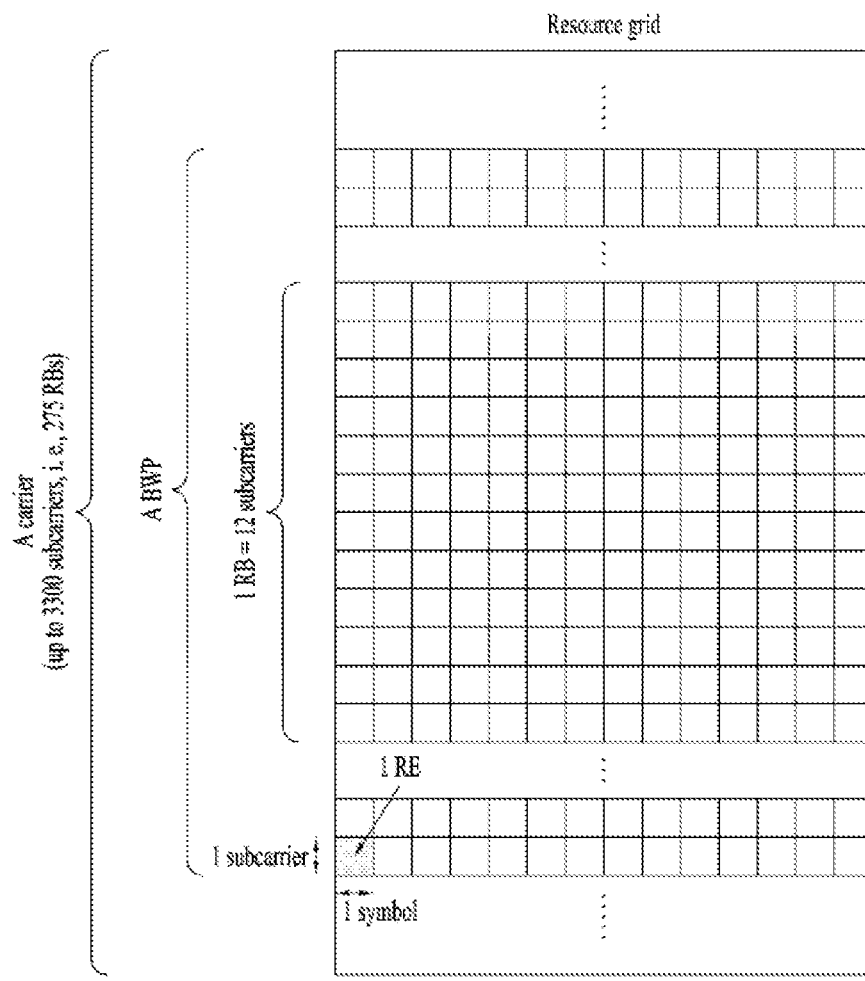

[FIG. 4]
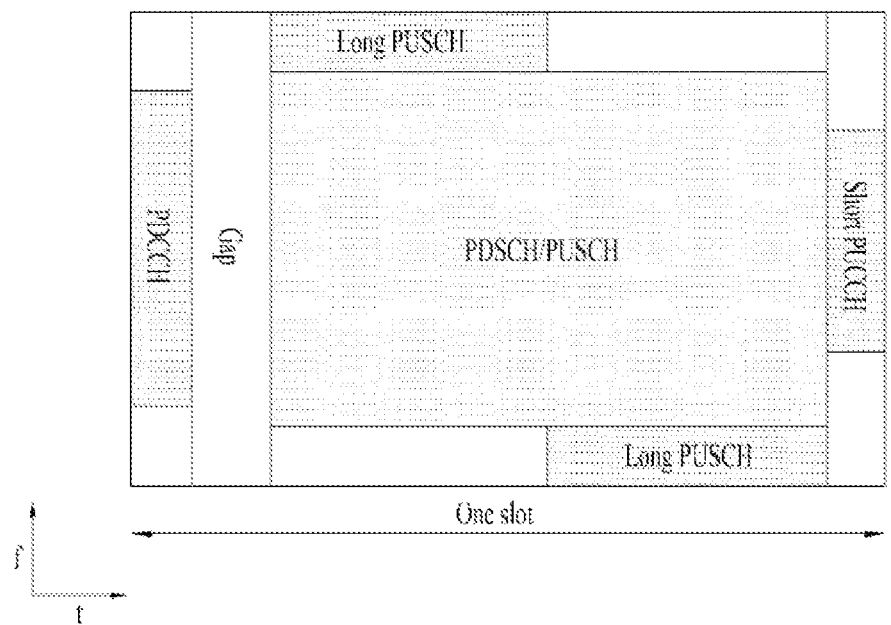

[FIG. 5]
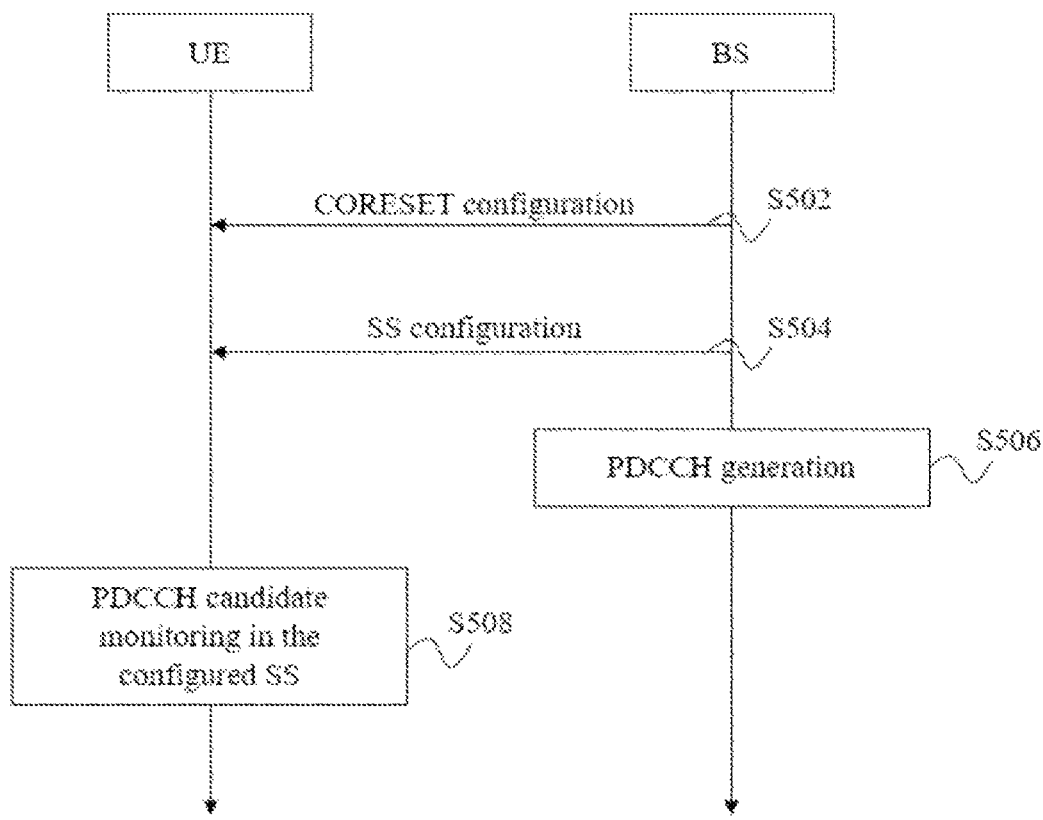

[FIG. 6]
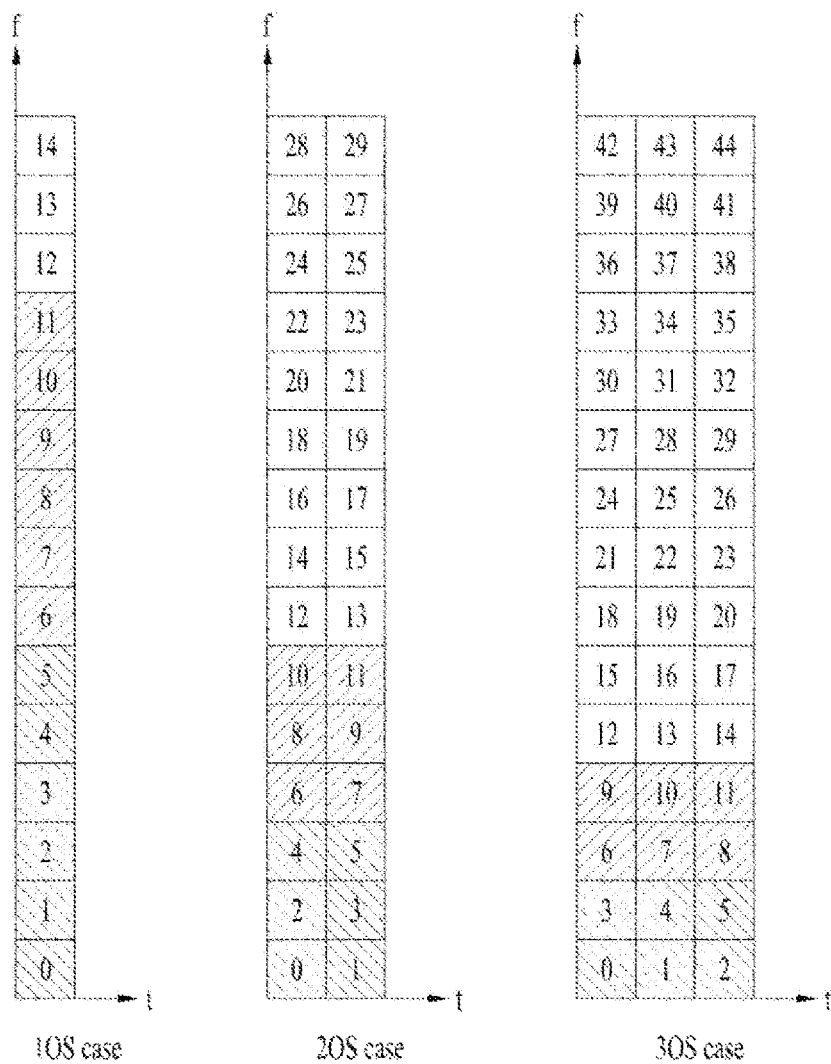
Non - interleaved CCE - to - REG mapping

[FIG. 7]
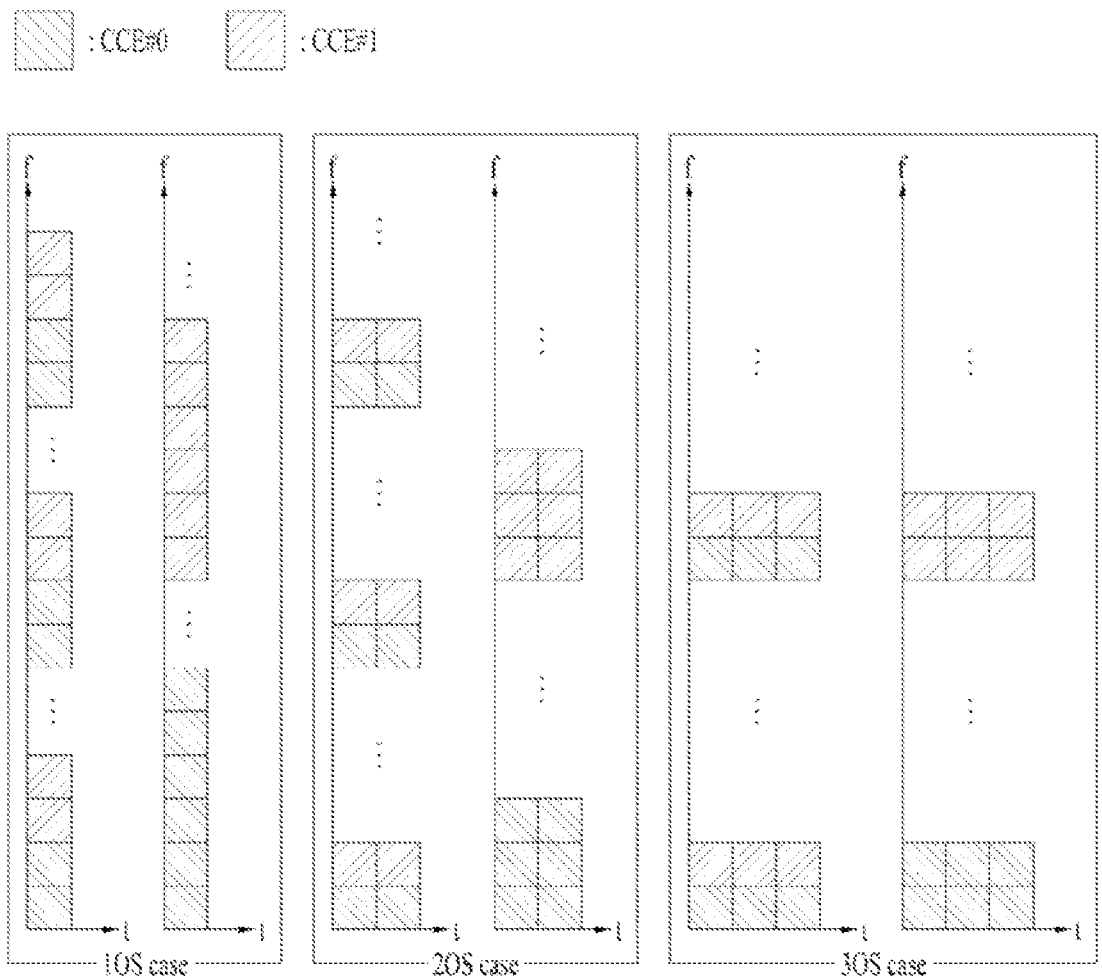

[FIG. 8]
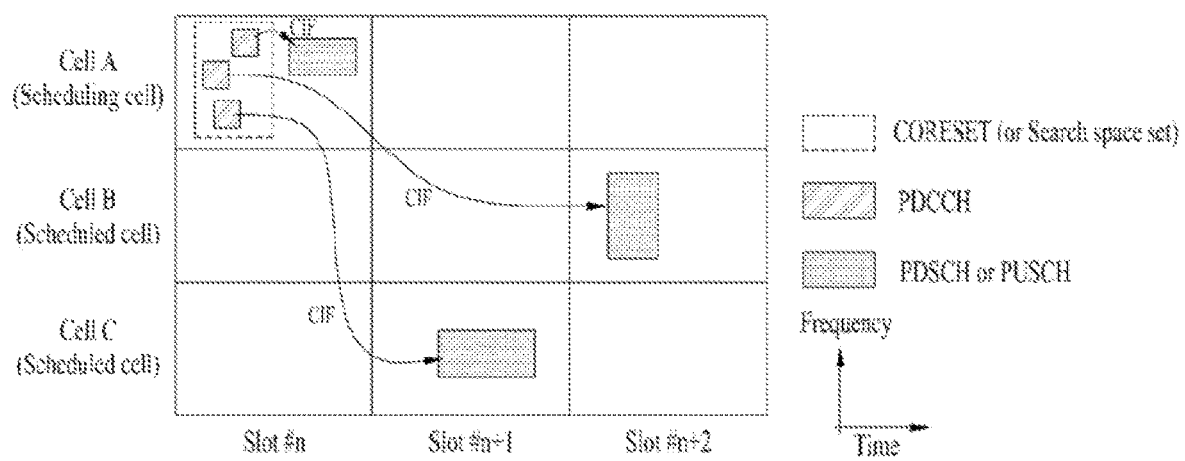

[FIG. 9]
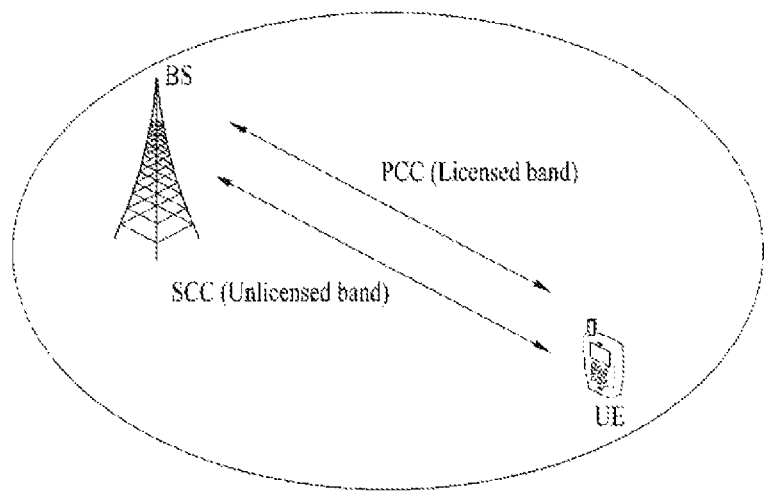
(a) Carrier aggregation between L-band and U-band
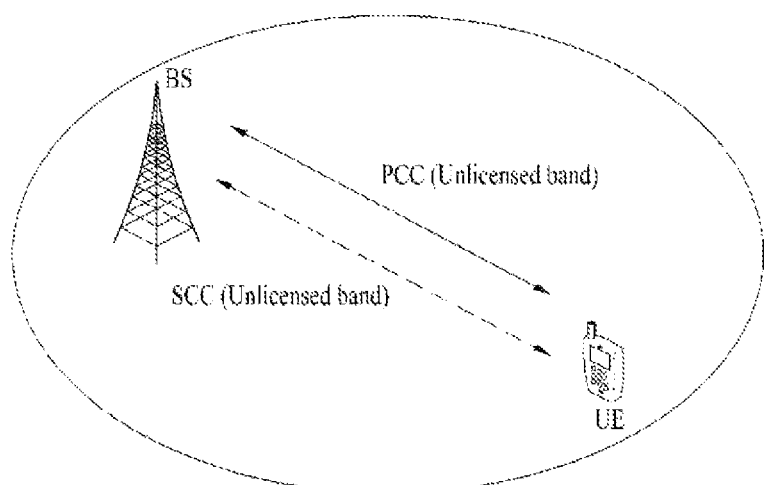
(b) standalone U-band(s)

[FIG. 10]
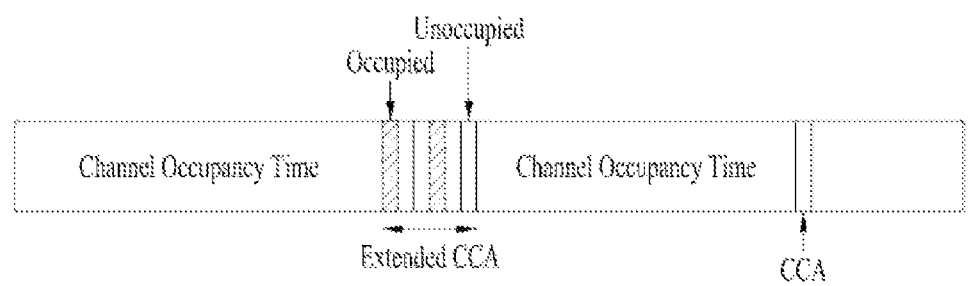

[FIG. 11]
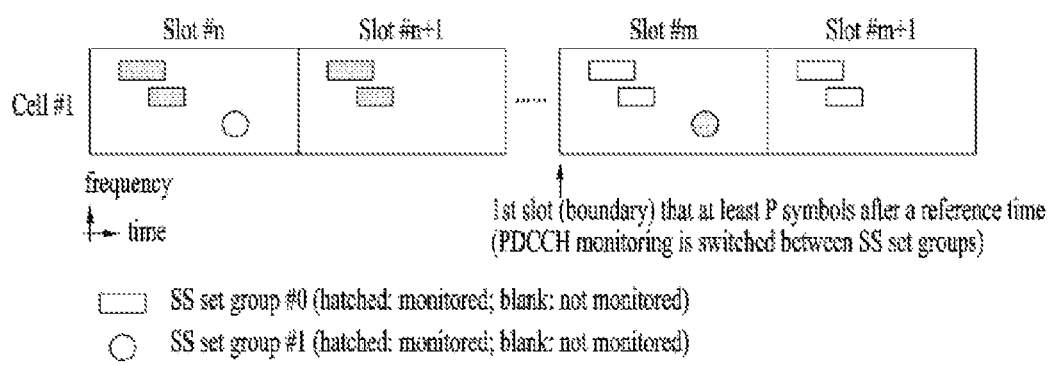

[FIG. 12]
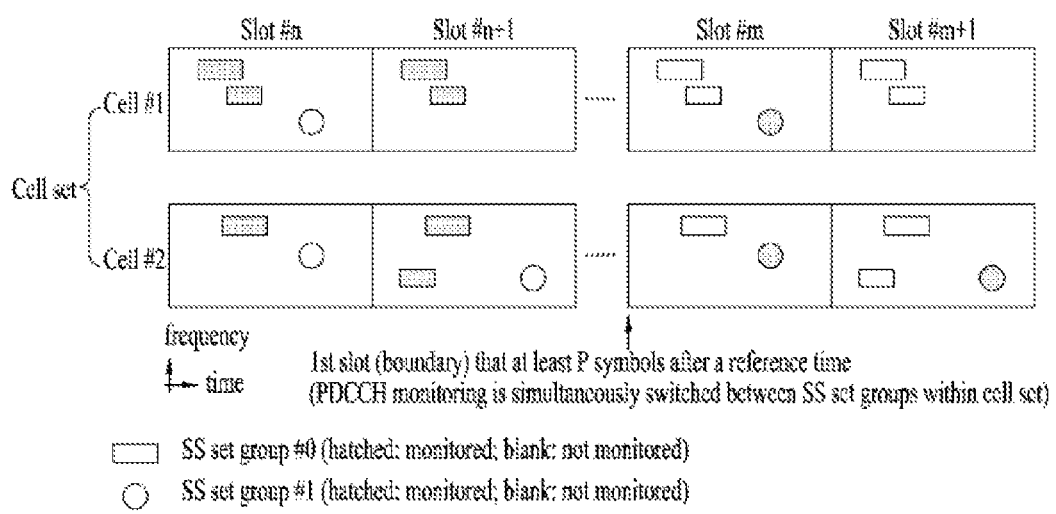

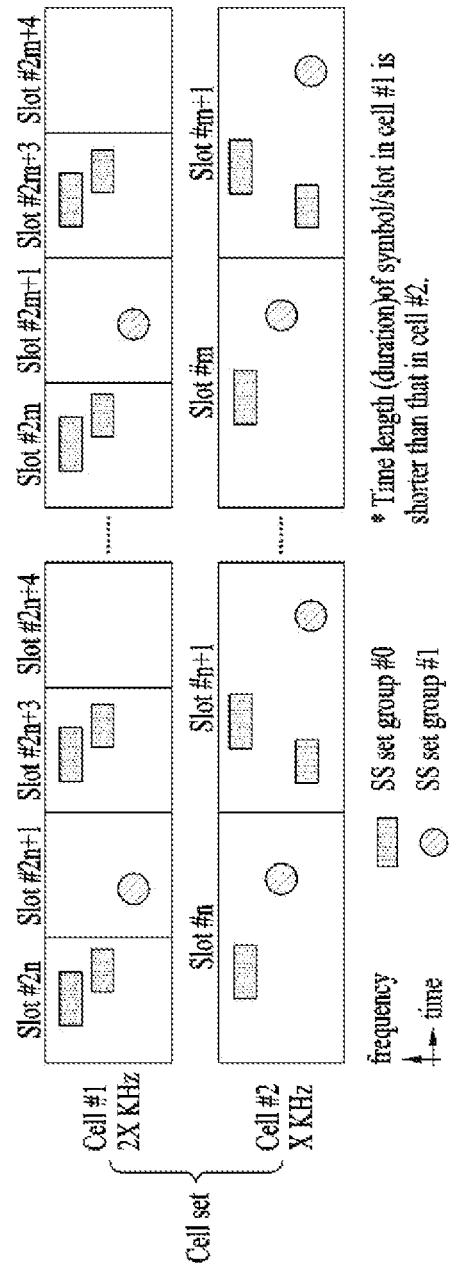
[FIG. 13]

[FIG. 14]
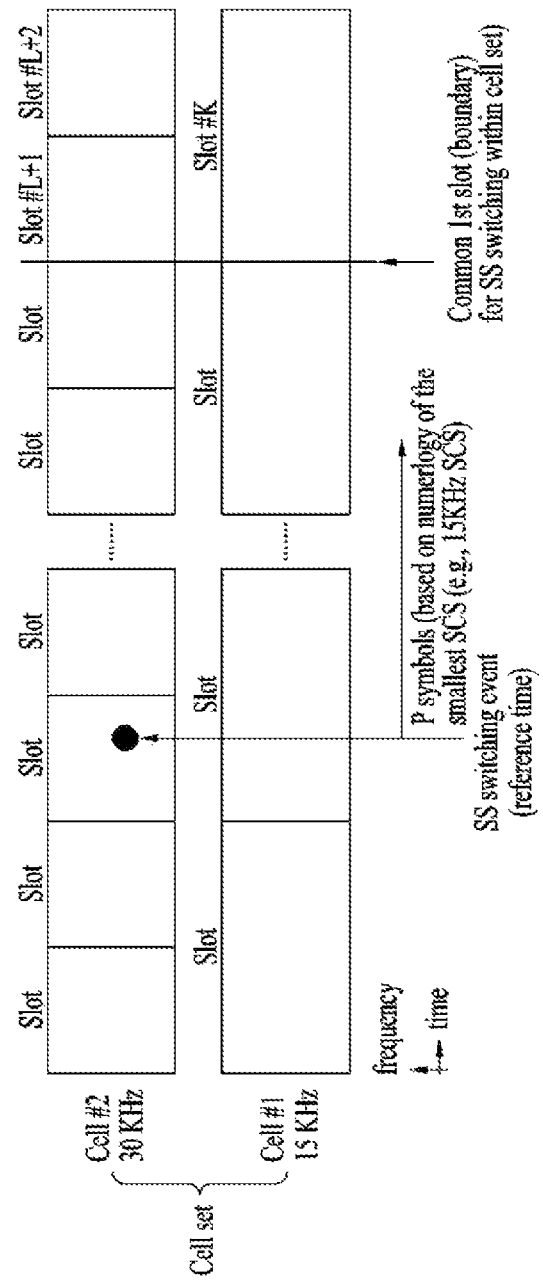

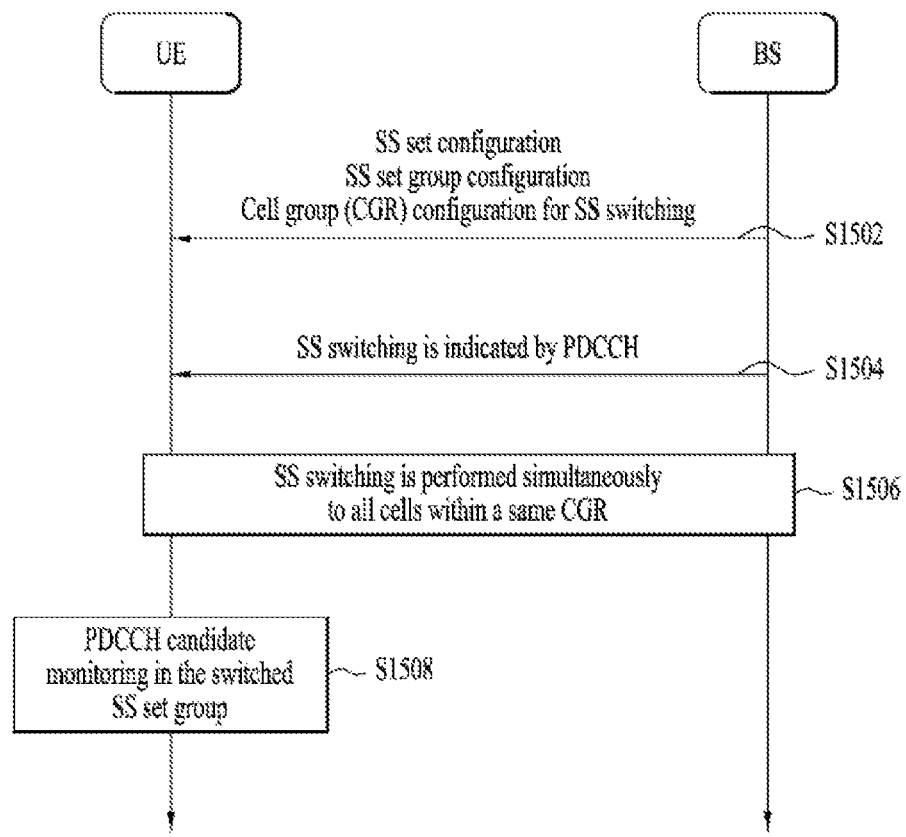
[FIG. 15]

[FIG. 16]
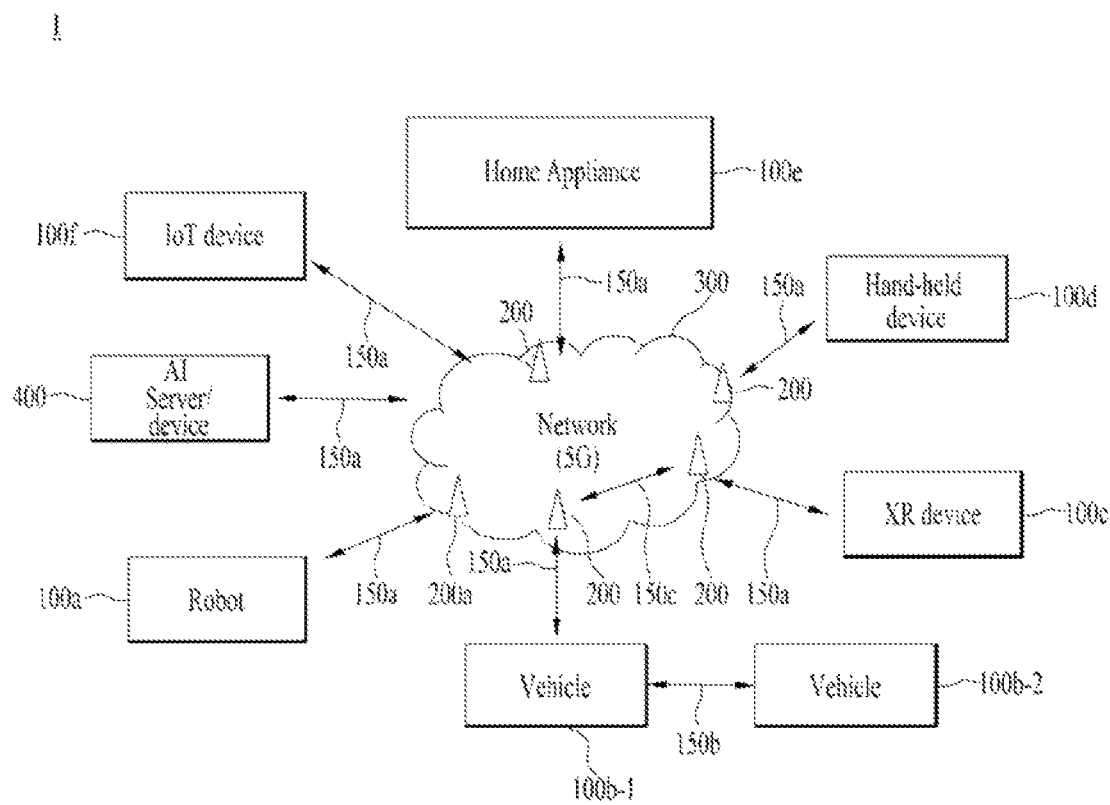

[FIG. 17]
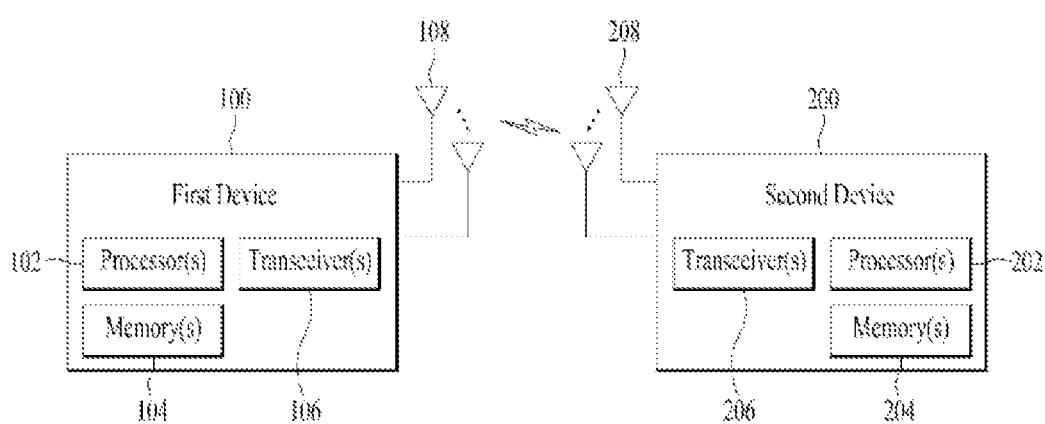

[FIG. 18]
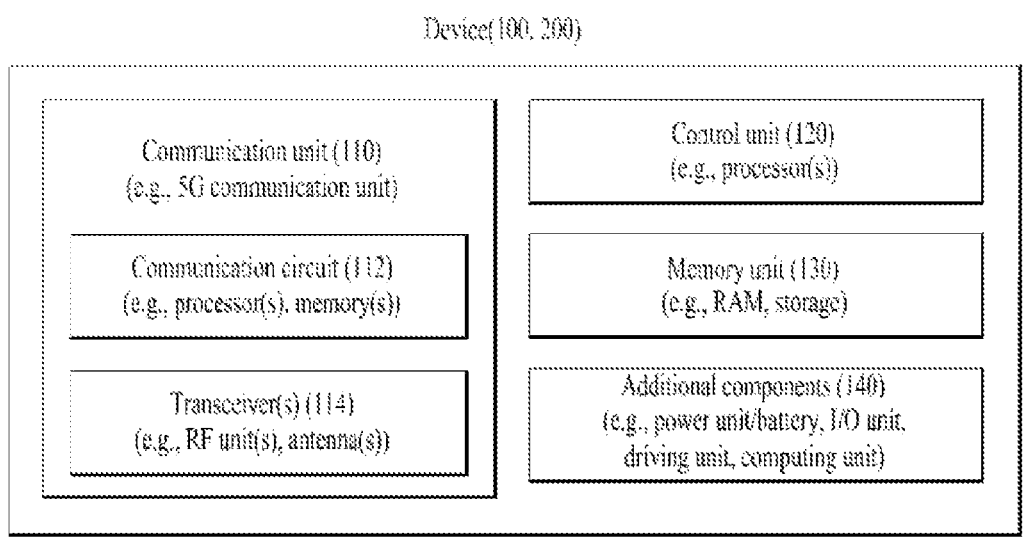

[FIG. 19]
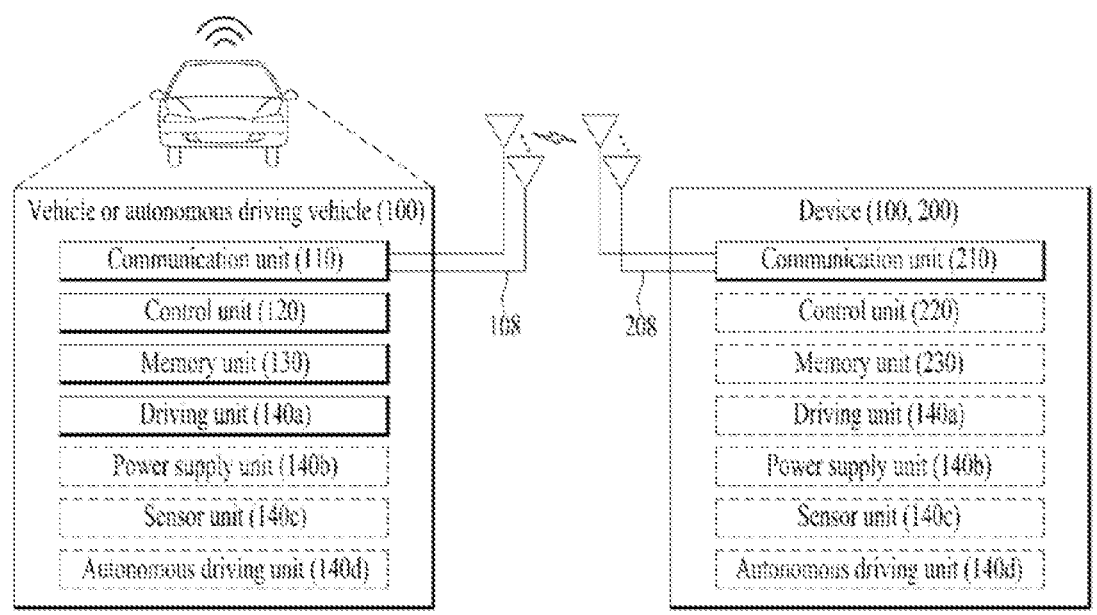

METHOD AND APPARATUS FOR TRANSMITTING AND RECEIVING WIRELESS SIGNAL IN WIRELESS COMMUNICATION SYSTEM

CROSS-REFERENCE TO RELATED APPLICATIONS

This application is a continuation of International Application No. PCT/KR2021/001913, filed on Feb. 15, 2021, which claims the benefit of earlier filing date and right of priority to Korean Application No. 10-2020-0017368, filed on Feb. 13, 2020, and also claims the benefit of U.S. Provisional Application Nos. 63/029,545, filed on May 24, 2020, and 63/030,239, filed on May 26, 2020, the contents of which are all hereby incorporated by reference herein in their entireties.

TECHNICAL FIELD

The present disclosure relates to a wireless communication system, and more particularly, to a method and apparatus for transmitting and receiving a wireless signal.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

Provided are a method and apparatus for efficiently performing a wireless signal transmission and reception process.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In a first aspect of the present disclosure, provided herein is a method for performing communication by a terminal in a wireless communication system, the method including performing first physical downlink control channel (PDCCH) monitoring in a first search space (SS) set group within a cell group configured for an SS set group switching operation, and stopping the first PDCCH monitoring in the first SS set group and starting second PDCCH monitoring in a second SS set group, from a first slot that is at least P symbols after a reference time, for cells in the cell group. Based on a plurality of subcarrier spacings (SCSs) being configured for the cell group, a numerology of the P symbols may be determined as a cell group-common value based on the smallest SCS among the plurality of SCSs.

In a second aspect of the present disclosure, provided herein is a terminal used in a wireless communication system, including at least one radio frequency (RF) unit, at least one processor, and at least one computer memory operatively coupled to the at least one processor and configured to cause, when executed, the at least one processor to perform operations. The operations may include performing first physical downlink control channel (PDCCH) monitoring in a first search space (SS) set group within a cell group configured for an SS set group switching operation, and stopping the first PDCCH monitoring in the first SS set group and starting second PDCCH monitoring in a second SS set group, from a first slot that is at least P symbols after a reference time, for cells in the cell group. Based on a plurality of subcarrier spacings (SCSs) being configured for the cell group, a numerology of the P symbols may be determined as a cell group-common value based on the smallest SCS among the plurality of SCSs.

In a third aspect of the present disclosure, provided herein is an apparatus for a terminal, including at least one processor, and at least one computer memory operatively coupled to the at least one processor and configured to cause, when executed, the at least one processor to perform operations. Provided herein is a terminal used in a wireless communication system, including at least one radio frequency (RF) unit, at least one processor, and at least one computer memory operatively coupled to the at least one processor and configured to cause, when executed, the at least one processor to perform operations. The operations may include performing first physical downlink control channel (PDCCH) monitoring in a first search space (SS) set group within a cell group configured for an SS set group switching operation, and stopping the first PDCCH monitoring in the first SS set group and starting second PDCCH monitoring in a second SS set group, from a first slot that is at least P symbols after a reference time, for cells in the cell group. Based on a plurality of subcarrier spacings (SCSs) being configured for the cell group, a numerology of the P symbols may be determined as a cell group-common value based on the smallest SCS among the plurality of SCSs.

In a fourth aspect of the present disclosure, provided herein is a computer-readable storage medium including at least one computer program that, when executed, causes at least one processor to perform operations. The operations may include performing first physical downlink control channel (PDCCH) monitoring in a first search space (SS) set group within a cell group configured for an SS set group switching operation, and stopping the first PDCCH monitoring in the first SS set group and starting second PDCCH monitoring in a second SS set group, from a first slot that is at least P symbols after a reference time, for cells in the cell group. Based on a plurality of subcarrier spacings (SCSs) being configured for the cell group, a numerology of the P symbols may be determined as a cell group-common value based on the smallest SCS among the plurality of SCSs.

The numerology of the P symbols may include a duration of the P symbols.

A boundary of the first slot may be determined based on the smallest SCS among the plurality of SCSs.

The stopping of the first PDCCH monitoring in the first SS set group and the starting of the second PDCCH monitoring in the second SS set group may be performed based on expiration of a timer set for each cell in the cell group, wherein, based on the plurality of SCSs being configured for the cell group, the timer for each cell may be set to the same value, and may be operated based on the smallest SCS among the plurality of SCSs.

The value of the timer may be changed at an end of each slot, wherein a duration of each slot may vary based on the SCSs.

The operations may further include detecting a PDCCH in the second SS set group based on the second PDCCH monitoring being started in the second SS set group.

Advantageous Effects

According to the present disclosure, a wireless signal may be efficiently transmitted and received in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, illustrate embodiments of the present disclosure and together with the description serve to explain the principle of the present disclosure.

FIG. 1 illustrates physical channels and a general signal transmission method using the physical channels in a 3rd generation partnership project (3GPP) system as an exemplary wireless communication system.

FIG. 2 illustrates a radio frame structure.

FIG. 3 illustrates a resource grid of a slot.

FIG. 4 illustrates mapping of physical channels in a slot.

FIG. 5 illustrates a Physical Downlink Control Channel (PDCCH) transmission/reception procedure.

FIGS. 6 and 7 illustrate the structure of a control resource set (CORESET).

FIG. 8 illustrates a scheduling method in a multi-carrier situation.

FIG. 9 illustrates an exemplary wireless communication system supporting an unlicensed band.

FIG. 10 illustrates an exemplary method of occupying resources in an unlicensed band.

FIGS. 11 and 12 illustrate an SS switching operation.

FIG. 13 illustrates a case where cells having different SCSs are included in a cell group.

FIGS. 14 and 15 illustrate an SS switching operation according to an example of the present disclosure.

FIGS. 16 to 19 illustrate a communication system 1 and wireless devices applied to the present disclosure.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

As more and more communication devices require larger communication capacities, the need for enhanced mobile broadband communication relative to the legacy radio access technologies (RATs) has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation radio access technology (RAT) for enhanced mobile broadband communication (eMBB), massive MTC (mMTC), and ultra-reliable and low latency communication (URLLC) is being discussed. For convenience, this technology is called NR or New RAT in the present disclosure.

While the following description is given in the context of a 3GPP communication system (e.g., NR) for clarity, the technical spirit of the present disclosure is not limited to the 3GPP communication system.

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

FIG. 1 illustrates physical channels and a general signal transmission method using the physical channels in a 3GPP system.

When a UE is powered on or enters a new cell, the UE performs initial cell search (S101). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

Subsequently, to complete connection to the BS, the UE may perform a random access procedure with the BS (S103 to S106). Specifically, the UE may transmit a preamble on a physical random access channel (PRACH) (S103) and may receive a PDCCH and a random access response (RAR) for the preamble on a PDSCH corresponding to the PDCCH (S104). The UE may then transmit a physical uplink shared channel (PUSCH) by using scheduling information in the RAR (S105), and perform a contention resolution procedure including reception of a PDCCH and a PDSCH signal corresponding to the PDCCH (S106).

After the above procedure, the UE may receive a PDCCH and/or a PDSCH from the BS (S107) and transmit a physical uplink shared channel (PUSCH) and/or a physical uplink control channel (PUCCH) to the BS (S108), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame, u}_{slot}$: the number of slots in a frame
* $N^{subframe, u}_{slot}$: the number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners.

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells. A symbol may include an OFDM symbol (or a CP-OFDM symbol) and an SC-FDMA symbol (or a discrete Fourier transform-spread-OFDM (DFT-s-OFDM) symbol).

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

FIG. 4 illustrates a structure of a slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel (e.g., PDCCH), and the last M symbols (hereinafter, UL control region) in the slot may be used to transmit a UL control channel (e.g., PUCCH). N and M are integers greater than or equal to 0. A resource region (hereinafter, a data region) that is between the DL control region and the UL control region may be used for DL data (e.g., PDSCH) transmission or UL data (e.g., PUSCH) transmission. The GP provides a time gap for the BS and UE to transition from the transmission mode to the reception mode or from the reception mode to the transmission mode. Some symbols at the time of DL-to-UL switching in a subframe may be configured as the GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling (CS), and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

FIG. 5 illustrates an exemplary PDCCH transmission/reception procedure.

Referring to FIG. 5, a BS may transmit a control resource set (CORESET) configuration to a UE (S502). A CORESET is defined as a set of resource element groups (REGs) with a given numerology (e.g., an SCS, a CP length, and so on). An REG is defined by one OFDM symbol and one (P)RB.

A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). The UE-specific RRC signaling may include, for example, an RRC setup message, BWP configuration information, and so on. Specifically, the CORESET configuration may include the following information/fields.

- controlResourceSetId: indicates the ID of a CORESET.
- frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.
- duration: indicates the time resources of the CORESET. Duration indicates the number of consecutive OFDM symbols included in the CORESET. Duration has a value of 1 to 3.
- cce-REG-MappingType: indicates a control channel element (CCE)-REG mapping type. Interleaved and non-interleaved types are supported.
- interleaverSize: indicates an interleaver size.
- pdcch-DMRS-ScramblingID: indicates a value used for PDCCH DMRS initialization. When pdcch-DMRS-ScramblingID is not included, the physical cell ID of a serving cell is used.
- precoderGranularity: indicates a precoder granularity in the frequency domain.
- reg-BundleSize: indicates an REG bundle size.
- tci-PresentInDCI: indicates whether a transmission configuration index (TCI) field is included in DL-related DCI.
- tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

- searchSpaceId: indicates the ID of an SS.
- controlResourceSetId: indicates a CORESET associated with the SS.
- monitoringSlotPeriodicityAndOffset: indicates a periodicity (in slots) and offset (in slots) for PDCCH monitoring.
- monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.
- nrofCandidates: indicates the number of PDCCH candidates (one of values 0, 1, 2, 3, 4, 5, 6, and 8) for each AL where AL={1, 2, 4, 8, 16}.
- searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. The UE may determine a PDCCH monitoring occasion on an active DL BWP in a slot according to a PDCCH monitoring periodicity, a PDCCH monitoring offset, and a PCCH monitoring pattern. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 exemplarily shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level)

PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

CCE-REG mapping is set to one of a non-interleaved CCE-REG mapping type or an interleaved CCE-REG mapping type.

Non-interleaved CCE-REG mapping type (or localized mapping type) (FIG. 6): An REG bundle is composed of 6 REGs for a given CCE, and the REGs for the given CCE are consecutive. One REG bundle corresponds to one CCE.

Interleaved CCE-REG mapping type (or distributed mapping type) (FIG. 7): An REG bundle is composed of 2, 3 or 6 REGs for a given CCE. The REG bundle is interleaved in a CORESET. A REG bundle in a CORESET consisting of 1 or 2 OFDM symbols is composed of 2 or 6 REGs, and a REG bundle in a CORESET consisting of 3 OFDM symbols is composed of 3 or 6 REGs. The size of the REG bundle is set for each CORESET.

Equation 1 represents the resources constituting an SS. Specifically, for SS set s associated with CORESET p, CCE indexes for aggregation level L corresponding to PDCCH candidate $m_{s,nCI}$ of the SS in slot $n^{\mu}_{s,f}$ of the active DL BWP of the serving cell (the value of the CI field, $n_{CI}$) may be given as follows.

$$L \cdot \left\{ \left( Y_{p,n^{\mu}_{s,f}} + \left\lfloor \frac{m_{s,n_{CI}} \cdot N_{CCE,p}}{L \cdot M^{(L)}_{s,max}} \right\rfloor + n_{CI} \right) \mod \lfloor N_{CCE,p}/L \rfloor \right\} + i, \quad \text{[Equation 1]}$$

where:

For the CSS, $Y_{p,n_{s,f}^{\mu}}=0$;

For the USS, $Y_{p,n_{s,f}^{\mu}}=(A_p \cdot Y_{p,n_{s,f}^{\mu}-1}) \mod D$, $Y_{p,-1}=n_{RNTI}\neq 0$, $A_p=39827$ for pmod3=0, $A_p=39829$ for pmod3=1, $A_p=39839$ for pmod3=2, and D=65537;

i=0, ..., L−1;

$N_{CCE,p}$ denotes the number of CCEs in CORESET p(0~$N_{CCE,P-1}$);

$n_{CI}$ indicates the CI value of a scheduled cell, and $n_{CI}$=0 when the PDCCH candidate in the CSS includes the CI field;

$m_{s,nCI}=0, ..., M^{(L)}_{s,nCI}-1$, where $M^{(L)}_{s,nCI}-1$ denotes the number of PDCCH candidates configured to be monitored by the UE for aggregation level L in SS set s for the serving cell corresponding to $n_{CI}$;

For the CSS, $M^{(L)}_{s,max}=M^{(L)}_{s,0}$;

For the USS, $M^{(L)}_{s,max}$ demotes the maximum value of $M^{(L)}_{s,nCI}$ for all values of $n_{CI}$ configured for aggregation level L in SS set s, RNTI indicates C-RNTI.

In NR, a wider UL/DL bandwidth may be supported by aggregating a plurality of UL/DL carriers (i.e., carrier aggregation (CA)). A signal may be transmitted/received over a plurality of carriers by CA. When CA is applied, each carrier (see FIG. 3) may be referred to as a component carrier (CC). CCs may be contiguous or non-contiguous in the frequency domain. The bandwidth of each CC may be determined independently. Asymmetric CA is also available, in which the number of UL CCs is different from the number of DL CCs. In NR, radio resources are divided into/managed in cells, and a cell may include one DL CC and zero to two UL CCs. For example, a cell may include (i) only one DL CC, (ii) one DL CC and one UL CC, or (iii) one DL CC and two UL CCs (including one supplementary UL CC). Cells are classified as follows. In the present disclosure, a cell may be interpreted in the context. For example, a cell may mean a serving cell. Further, operations described herein may be applied to each serving cell, unless otherwise specified.

PCell (Primary Cell): For a UE configured with CA, a cell operating in a primary frequency (e.g., primary component carrier (PCC)) in which the UE performs an initial connection establishment procedure or initiates a connection re-establishment procedure. In dual connectivity (DC), a master cell group (MCG) cell operating in a primary frequency in which a UE performs the initial connection establishment procedure or initiates the connection re-establishment procedure.

SCell (Secondary Cell): For a UE configured with CA, an additional cell that provides radio resources, except a special cell.

PSCell (Primary SCG Cell): In DC, a secondary cell group (SCG) cell in which a UE performs random access during RRC reconfiguration and synchronization.

Special Cell (SpCell): In DC, a special cell is the PCell of an MCG or the PSCell of an SCG. Otherwise (i.e., in non-DC), a special cell is a PCell.

Serving Cell (ServCell): A cell configured for an RRC_CONNECTED UE. When CA/DC is not configured, there is only one serving cell (i.e., PCell). When CA/DC is configured, a serving cell is a cell set including SpCell(s) and all SCells.

Control information may be configured to be transmitted and received only in a specific cell. For example, UCI may be transmitted only in an SpCell (e.g., PCell). When an SCell allowed for PUCCH transmission (hereinafter, referred to as PUCCH-SCell) is configured, UCI may also be transmitted in the PUCCH-SCell. In another example, the BS may allocate a scheduling cell (set) to reduce the PDCCH BD complexity of the UE. For PDSCH reception/PUSCH transmission, the UE may perform PDCCH detection/decoding only in the scheduling cell. Further, the BS may transmit a PDCCH only in the scheduling cell (set). For example, data (e.g., a PDSCH or a PUSCH) transmitted in one cell (or an active BWP in the cell) (hereinafter, a cell may be replaced with an (active) BWP in the cell) may be scheduled by a PDCCH in the cell (self-carrier scheduling (SCS)). Further, a PDCCH for a DL assignment may be transmitted in cell #0 (i.e., a scheduling cell) and a corresponding PDSCH may be transmitted in cell #2 (i.e., a scheduled cell) (cross-carrier scheduling (CCS)). The scheduling cell (set) may be configured UE-specifically, UE group-specifically, or cell-specifically. The scheduling cell includes an SpCell (e.g., PCell).

For CCS, a carrier indicator field (CIF) is used. The CIF may be disabled/enabled semi-statically by UE-specific (or UE group-specific) higher-layer signaling (e.g., RRC signaling). The CIF is an x-bit field (e.g., x=3) of a PDCCH (i.e., DCI) and may be used to indicate the (serving) cell index of a scheduled cell.

CIF disabled: The PDCCH does not include the CIF. The PDCCH in the scheduling cell allocates PDSCH/PUSCH resources in the same cell. That is, the scheduling cell is identical to the scheduled cell.

CIF enabled: The PDCCH includes the CIF. The PDCCH in the scheduling cell may allocate PDSCH/PUSCH resources in one of a plurality of cells by the CIF. The scheduling cell may be identical to or different from the scheduled cell. A PDSCH/PUSCH means a PDSCH or a PUSCH.

FIG. 8 illustrates exemplary scheduling in the case of multi-cell aggregation. Referring to FIG. 8, it is assumed that three cells are aggregated. When the CIF is disabled, only a PDCCH that schedules a PDSCH/PUSCH in each cell may be transmitted in the cell (SCS). On the contrary, when the CIF is enabled by UE-specific (or UE group-specific or cell-specific) higher-layer signaling, and cell A is configured as a scheduling cell, a PDCCH that schedules a PDSCH/PUSCH in another cell (i.e., a scheduled cell) as well as a PDCCH that schedules a PDSCH/PUSCH in cell A may be transmitted in cell A (CCS). In this case, no PDCCH that schedules a PDSCH/PUSCH in cell B/C is transmitted in cell B/C.

FIG. 9 illustrates an exemplary wireless communication system supporting an unlicensed band applicable to the present disclosure. In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When carrier aggregation is supported, one UE may use a plurality of aggregated cells/carriers to exchange a signal with the BS. When one UE is configured with a plurality of CCs, one CC may be set to a primary CC (PCC), and the remaining CCs may be set to secondary CCs (SCCs). Specific control information/channels (e.g., CSS PDCCH, PUCCH) may be transmitted and received only on the PCC. Data may be transmitted and received on the PCC/SCC. FIG. 9(a) shows a case in which the UE and BS exchange signals on both the LCC and UCC (non-standalone (NSA) mode). In this case, the LCC and UCC may be set to the PCC and SCC, respectively. When the UE is configured with a plurality of LCCs, one specific LCC may be set to the PCC, and the remaining LCCs may be set to the SCC. FIG. 9(a) corresponds to the LAA of the 3GPP LTE system. FIG. 9(b) shows a case in which the UE and BS exchange signals on one or more UCCs with no LCC (standalone (SA) mode). In this case, one of the UCCs may be set to the PCC, and the remaining UCCs may be set to the SCC. Both the NSA mode and SA mode may be supported in the U-band of the 3GPP NR system.

FIG. 10 illustrates an exemplary method of occupying resources in an unlicensed band. According to regional regulations for an unlicensed band, a communication node should determine whether other communication node(s) is using a channel in the unlicensed band, before signal transmission. Specifically, the communication node may determine whether other communication node(s) is using a channel by performing carrier sensing (CS) before signal transmission. When the communication node confirms that any other communication node is not transmitting a signal, this is defined as confirming clear channel assessment (CCA). In the presence of a CCA threshold predefined by higher-layer signaling (RRC signaling), when the communication node detects energy higher than the CCA threshold in the channel, the communication node may determine that the channel is busy, and otherwise, the communication node may determine that the channel is idle. For reference, the WiFi standard (e.g., 801.11ac) specifies a CCA threshold of −62 dBm for a non-WiFi signal and a CCA threshold of −82 dBm for a WiFi signal. When determining that the channel is idle, the communication node may start signal transmission in a UCell. The above-described series of operations may be referred to as a listen-before-talk (LBT) or channel access procedure (CAP). LBT and CAP may be interchangeably used. After performing the CAP, the BS/UE may perform transmission on the channel (Channel occupancy). The Channel Occupancy Time (COT) represents the total time for which the BS/UE and a BS/UE(s) sharing the channel occupancy may continue/perform transmission(s) on the channel after the BS/UE performs the CAP. The COT may be shared for transmission between the BS and the corresponding UE(s).

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set $q \in \{4, 5, \ldots, 32\}$ and then perform CCA for one CCA slot. When the channel is unoccupied in the first CCA slot, the communication node may secure a time period of up to $(13/32)q$ ms and transmit data in the time period. When the channel is occupied in the first CCA slot, the communication node randomly selects $N \in \{1, 2, \ldots, q\}$, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to $(13/32)q$ ms and transmit data.

Embodiment: SS Set Group Switching

In the 3GPP Rel-15 NR system, a plurality of BWPs (e.g., up to 4 BWPs) may be configured in a cell, and only one of the BWPs may be activated. In addition, one or more SS sets may be linked to a CORESET, and a maximum of 10 SS sets may be configured per BWP. In each SS set, not only the time resource (period (in units of slots), an offset (units of slots), and an in-slot interval (in-slot position) in which the linked CORESET is positioned, but also a DCI format and the number of PDCCH candidates per AL may be configured.

In the unlicensed band, the CAP success time of the BS may not be predicted. Accordingly, it may be advantageous in terms of efficient channel occupancy of the BS to configure a short PDCCH monitoring period or time instance interval. However, configuring the PDCCH monitoring period or time instance interval to be short may increase power consumption of the UE. Accordingly, configuring a relatively long PDCCH monitoring period (or SS set period) or time instance interval within the COT acquired by the BS may be advantageous in terms of the UE power consumption. Therefore, the PDCCH monitoring period, that is, the monitoring pattern set in the SS set, may be configured differently depending on whether it belongs to the COT of the BS.

To support this configuration, RRC signaling for grouping SS sets has been introduced in 3GPP Rel-16 NR-U. In a slot, PDCCH monitoring may be allowed for only one SS set group. SS sets for which PDCCH monitoring is performed may be switched in units of SS set groups (hereinafter, this operation is referred to as SS set group switching or SS (set) switching). An SS set group for which PDCCH monitoring is performed may be indicated by DCI signaling or the like, or may be recognized by the UE according to the COT structure of the BS identified by the UE.

FIG. 11 illustrates SS switching. Referring to FIG. 11, one or more SS set groups (simply referred to as groups) may be configured for SS sets configured in a BWP in a cell (e.g., cell #1). For example, two groups may be configured. When five SS sets (e.g., SS sets #0 to #4) are configured in a BWP, the groups may be configured as follows.

Group #0 of cell #1: SS set #2/3;
Group #1 of cell #1: SS set #3/4.

There may be an SS set that does not belong to any group may exist, such as SS set #0/1. Also, there may be an SS set belonging to every group, such as SS set #3. The UE may perform PDCCH monitoring for only one group among a plurality of groups in a slot, and groups for which PDCCH monitoring is performed may be switched based on an event.

Specifically, based on a first switching condition (hereinafter, a first condition) being triggered, switching from group #0 to group #1 may be performed. The first condition may include all or part of the following conditions:

Switching to group #1 is indicated through a switching flag (e.g., an SS set group switching field) in DCI format 2_0 (e.g., Case 2 in Table 5); and
A PDCCH is detected in an SS set belonging to group #0 (e.g., Case 4 in Table 5).

When the first condition is satisfied, PDDCH monitoring for group #0 may be stopped and PDDCH monitoring for group #1 may be started/initiated at the first slot boundary after at least P1 symbols,. P1 is an integer greater than or equal to 0, and may be a positive integer.

Also, based on a second switching condition (hereinafter, a second condition) being triggered, switching from group #1 to group #0 may be performed. The second condition may include all or part of the following conditions:

Switching to group #0 is indicated through the switching flag in DCI format 2_0 (e.g., Case 1 in Table 5); and
The COT of the BS indicated through DCI format 2_0 expires;
The value of the timer (which may be preset by RRC signaling, wherein the timer may be set based on the number of slots and be decremented by 1 at the end of each slot) started due to PDCCH detection expires (e.g., Cases 3 and 5 in Table 5)

When the second condition is satisfied, PDDCH monitoring for group #1 may be stopped at the first slot boundary and PDDCH monitoring for group #0 may be started/initiated after at least P2 symbols. P2 is an integer greater than or equal to 0, and may be a positive integer.

Table 5 shows some modifications based on TS 38.213 v16.0.0.

TABLE 5

10.4 Search space set switching
A UE can be provided a group index for a respective search space set by searchSpaceGroupIdList-r16 for PDCCH monitoring on a serving cell indicated by searchSpaceSwitchingGroup-r16. If the UE is not provided searchSpaceGroupIdList-r16 for a search space set, or for PDCCH monitoring on a serving cell that is not indicated by searchSpaceSwitchingGroup-r16, the following procedures are not applicable for PDCCH monitoring according to the search space set.
A UE can be provided, by searchSpaceSwitchingTimer-r16, a timer value. The UE decrements the timer value by one after each slot in the active DL BWP of the serving cell where the UE monitors PDCCH for detection of DCI format 2_0.
If a UE is provided by SearchSpaceSwitchTrigger-r16 a location of a search space set switching field for a serving cell in a DCI format 2_0, and detects DCI format 2_0 in a slot
  - if the UE is not monitoring PDCCH according to search space sets with group index 0, the UE starts monitoring PDCCH according to search space sets with group index 0, and stops monitoring PDCCH according to search space sets with group index 1, on the serving cell at a first slot that is at least P1 symbols after the slot (or, after the last symbol of the corresponding PDCCH) in the active DL BWP of the serving cell, if a value of the search space set switching field is 0 (Case 1)
  - if the UE is not monitoring PDCCH according to search space sets with group index 1, the UE monitors PDCCH according to search space sets with group index 1, and stops monitoring PDCCH according to search space sets with group index 0, on the serving cell at a first slot that is at least P1 symbols after the slot (or, after the last symbol of the corresponding PDCCH) in the active DL BWP of the serving cell, and the UE sets the timer value to the value provided by searchSpaceSwitchingTimer-r16, if a value of the search space set switching field is 1 (Case 2)
  - if the UE monitors PDCCH on a serving cell according to search space sets with group index 1, the UE starts monitoring PDCCH on the serving cell according to search space sets with group index 0, and stops monitoring PDCCH according to search space sets with group index 1, on the serving cell at the beginning of the first slot that is at least P1 symbols after a slot where the timer expires or after a last slot of a remaining channel occupancy duration for the serving cell that is indicated by DCI format 2_0 (Case 3)
If a UE is not provided SearchSpaceSwitchTrigger-r16 for a serving cell,
  - if the UE detects a DCI format by monitoring PDCCH according to a search space set with group index 0 in a slot, the UE starts monitoring PDCCH according to search space sets with group index 1, and stops monitoring PDCCH according to search space sets with group index 0, on the serving cell at a first slot TABLE 5-continued that is at least P2 symbols after the slot (or, after the last symbol of the corresponding PDCCH) in the active DL BWP of a serving cell, the UE sets the timer value to the value provided by searchSpaceSwitchingTimer-r16 if the UE detects a DCI format by monitoring PDCCH in any search space set (Case 4)
- if the UE monitors PDCCH on a serving cell according to search space sets with group index 1, the UE starts monitoring PDCCH on the serving cell according to search space sets with group index 0, and stops monitoring PDCCH according to search space sets with group index 1, on the serving cell at the beginning of the first slot that is at least P2 symbols after a slot where the timer expires or, if the UE is provided a search space set to monitor PDCCH for detecting a DCI format 2_0, after a last slot of a remaining channel occupancy duration for the serving cell that is indicated by DCI format 2_0 (Case 5)

A plurality of cells may be configured as a cell group (hereinafter, CGR) for SS switching. In this case, the SS switching operation may be equally applied to the cell group. For example, a plurality of SS set groups may be set in each of cell #1 and cell #2. Cell #1 and cell #2 may be configured as a CGR. In this case, when the SS switching condition is satisfied for one cell, SS switching may be performed even for the other cell.

FIG. 12 illustrates SS switching performed when a CGR for SS switching is configured. Referring to FIG. 12, one or more SS set groups (simply, groups) may be configured for SS sets configured in a BWP in a cell (e.g., cell #1). For example, two groups may be configured. When five SS sets (e.g., SS sets #0 to #4) are configured in a BWP, the groups may be configured as follows:

Group #0 of cell #1: SS set #2/3;
Group #1 of cell #1: SS set #3/4.

Similarly, one or more groups may be configured for SS sets configured in a BWP in the other cell (e.g., cell #2) as follows:

Group #0 of cell #2: SS set #2;
Group #1 of Cell #2: SS set #3.

When cells #1/#2 are configured as a CGR, switching from group #0 to group #1 may be performed for both cells based on the first condition being triggered. When the first condition is satisfied, the UE may perform PDCCH monitoring in an SS set linked to a group to which switching is actually at the first slot boundary that follows at least P1 symbols (after a reference time). P1 is an integer greater than or equal to 0, and may be a positive integer. Also, based on the second condition being triggered, switching from group #1 to group #0 may be performed for both cells. When the second condition is satisfied, the UE may perform PDCCH monitoring in an SS set linked to a group to which switching is actually at the first slot boundary that follows at least P2 symbols (after the reference time). P2 is an integer greater than or equal to 0, and may be a positive integer.

FIG. 12 illustrates a case where all cells in a CGR have the same numerology (e.g., SCS (see Table 1)). In this case, since the cells have the same slot/symbol duration, and accordingly there is no difference between the cells in terms of the time to apply SS switching determined based on a symbol/slot. However, when different numerologies are configured in the CGR (namely, when cells/BWPs have different numerologies), the slot/symbol duration may differ between the cell, and accordingly the time to apply SS switching may vary depending on a cell whose symbol/slot forms the basis of determination of the time.

Hereinafter, a method of determining an SS switching time when the numerology differs between cells configured in a CGR (or between intra-cell (active) BWPs) is proposed. Here, the CGR may include a plurality of cells to which SS switching is applied. In the following description, when a plurality of BWPs is configured in a cell, the cell may be replaced with an (active) BWP in the cell. In addition, SS switching may be used not only in the unlicensed band, but also in the licensed band.

1) Receiver (Entity A (e.g. UE)):

[Method #1] Setting a reference time at which the first/second condition is triggered (or when switching is performed on the first slot (boundary) after at least P1/P2 symbols based on the first/second condition being triggered, configuring a reference symbol when P1=P2=0)

When the first (or second) condition is triggered due to the PDCCH detected in cell #1 in a CGR, the last symbol (e.g., symbol index N) for the PDCCH (or the CORESET including the PDCCH) on cell #1) may be defined as a reference time. When cell #1 and cell #2 belonging to the same CGR have the same numerology (e.g., SCS), the reference times may be aligned with the same symbol index (see FIG. 12). However, when the numerology differs between the cells (or BWPs) belonging to the same CGR, the reference times may not be aligned. Considering that configuring the same SS set switching time for the cells may reduce complexity in terms of the PDCCH monitoring operation of the UE, a rule needs to be established such that the reference times are aligned among the cells in the CGR.

As a method, a specific (e.g., first or last) symbol in cell #2 overlapping with symbol index N in cell #1 may be defined as a reference time for cell #2. As an example, when there are two symbols M and M+1 in 30 kHz SCS cell #2 coexisting (i.e., overlapping in time) with symbol n in 15 kHz SCS cell #1, the last symbol index, symbol #M+1, may be defined as the reference symbol for inter-cell alignment.

This method may be equally applied to determining a reference time for determining a PDCCH detection time when a timer operation starts due to PDCCH detection (which is one of the conditions for triggering the second condition). For example, when the last symbol in cell #1 for a certain PDCCH (transmitted in cell #1) (or a CORESET linked to the PDCCH) is symbol #N, the reference time for cell #1 may be symbol #N, and a specific (e.g., first or last) symbol in cell #2 overlapping with symbol #N in cell #1 may be defined as a reference time for cell #2. The timer operation may be started at the reference time.

[Method #2] A method for determining the first slot (boundary) when switching is performed on the first slot (boundary) after at least P1/P2 symbols based on the first/second condition being triggered When the first (or second) condition is triggered, PDCCH monitoring through an SS set associated with the switched group may be performed/started from the UE perspective on the first slot (boundary) following at least P1 (or P2) symbols (after the reference time). In the case where cell #1 and cell #2 belonging to the same CGR have the same numerology, the first slots (slot boundaries) may be aligned at the same time (see FIG. 12). Here, the numerology may include a symbol/slot duration and SCS, and reference may be made to Table 1. Referring to Table 1 and FIG. 2, the symbol/slot duration varies based on the SCS. Accordingly, when cells (or BWPs) belonging to the same CGR have different numerologies, the corresponding time points may not be aligned. FIG. 13 illustrates a case where the numerology differs between cells (or BWPs) belonging to a CGR. Referring to FIG. 13, it is assumed that the SCS of cell #1 is 2X kHz and the SCS of cell #2 is X kHz. In this case, the duration (or period) of the symbol/slot of cell #1 is configured to be shorter than the duration of the symbol/slot of cell #2. Accordingly, considering that configuring the same SS set switching time for the cells may reduce complexity in terms of the PDCCH monitoring operation of the UE, a rule needs to be established such that the times are aligned among the cells in the CGR.

Opt1: The first slot (boundary) after at least P1/P2 symbols may be determined based on a specific cell/numerology in the CGR, and the corresponding time point may be applied to other cells in common. The specific cell/numerology may be determined by the cell index (e.g., the least or greatest cell index), determined by the cell (representative) numerology (e.g., smallest SCS or largest SCS), configured by higher layer (e.g., RRC) signaling, or determined as a cell/numerology in which a specific PDCCH related to the second condition is transmitted. Alternatively, the specific cell may be determined as a cell configured with the same numerology as the reference numerology of the value of P1 or P2.

For example, referring to FIG. 14, 15 kHz SCS cell #1 may be configured/determined as a reference cell (i.e., the smallest SCS), and the first slot (boundary) (e.g., slot index K) after at least P1 or P2 symbols may be determined based on the numerology corresponding to 15 kHz SCS. That is, whether the time corresponding to P1 or P2 symbols has elapsed may be determined based on the 15 kHz SCS-based symbol duration. In this case, when slots index L and L+1 in 30 kHz SCS cell #2 overlap with slot index K in 15 kHz SCS cell #1, a specific one (e.g., slot index L or slot index L+1) of the slots It may be determined as the first slot (boundary) in cell #2. As another example, 30 kHz SCS cell #2 may be configured/determined as a reference cell (i.e., the largest SCS), and the first slot (boundary) (e.g., slot index K) after at least P1 or P2 symbols may be determined based thereon. In this case, slot #L in 15 kHz SCS cell #1 overlapping with slot index K in 30 kHz SCS cell #2 may be determined as the first slot (boundary) in cell #1. Here, the values of P1 and/or P2 may be set differently for each numerology, as described in Opt2. For example, the values of P1 and/or P2 may be replaced with the value of $P_{switch}$ shown in Table 6.

Opt2: The first slot (boundary) after at least P1/P2 symbols may be individually calculated for each cell in the CGR, and a representative time may be determined based on a specific cell/numerology among the cells. The specific cell/numerology may be determined by the cell index (e.g., the least or greatest cell index), determined by the cell (representative) numerology (e.g., smallest SCS or largest SCS), configured by higher layer (e.g., RRC) signaling, determined as a cell/numerology in which a specific PDCCH related to the second condition is transmitted, or determined as a cell/numerology followed (or preceded) by the calculated slot (boundary). For example, for 15 kHz SCS cell #1, the first slot (boundary) (e.g., slot index K) after at least P1/P2 symbols may be calculated. For 30 kHz SCS cell #1, the first slot (boundary) (e.g., slot index L) after at least P1/P2 symbols (wherein the values of P1 and/or P2 may differ among numerologies). In this case, when 15 kHz SCS cell #1 is configured/determined as a reference cell, and slot index T and slot index T+1 in 30 kHz SCS cell #2 overlap with slot index K in 15 kHz SCS cell #1, a specific slot (e.g., slot index T or slot index T+1) may be determined as the first slot (boundary) in cell #2. Alternatively, when 30 kHz SCS cell #2 is configured/determined as the reference cell, a slot in 15 kHz SCS cell #1 overlapping with slot index L in 30 kHz SCS cell #2 may be determined as the first slot (boundary).

[Method #3] Setting a timer value corresponding to one of the second conditions

Considering that numerology may differ among cells (or BWPs) in the CGR, a separate timer value may be set for each cell (or BWP) or numerology by higher layer (e.g., RRC) signaling. However, considering that configuring the same SS set switching time for the cells (or BWPs) in the CGR may reduce complexity in terms of the PDCCH monitoring operation of the UE, a common timer value may be set even when the numerology differs between the cells (or BWP). Accordingly, the timer value may be set independently of the SCS (in a time unit such as, for example, ms), or may be set based on representative numerology (e.g., the number of slots/symbols based on 15 kHz; the number of slots/symbols based on the smallest or largest SCS in the CGR; or the number of slots/symbols based on the numerology of a specific representative cell). When the timer value is set based on the representative numerology, the value of the timer may be changed (e.g., decremented by 1) on a slot basis as in the existing cases, and the timer may be operated based on the slot duration corresponding to the SCS.

[Method #4] In consideration of the UE processing complexity involved when numerology differs between cells (or BWPs), the UE may expect that the same numerology is configured for the cells (or BWPs) belonging to a CGR.

[Method #5] For a cell in which FBE is configured (or a CGR including the cell in which FBE is configured), a rule may be defined to start monitoring group #0 at the start of every fixed frame period (FFP).

As shown in Table 6, the UE is configured to report the capability it has for the minimum $P_{switch}$ value for each SCS. When a specific capability is not reported, it means that the UE supports capability 1. Reporting the specific capability means that the UE supports capability 2. In this regard, the BS may set a value greater than or equal to the minimum $P_{switch}$ value corresponding to the UE capability for the UE through higher layer (e.g., RRC) signaling.

TABLE 6

| u | Minimum $P_{switch}$ value for UE processing capability 1 [symbols] | Minimum $P_{switch}$ value for UE processing capability 2 [symbols] |
|---|---|---|
| 0 | 25 | 10 |
| 1 | 25 | 12 |
| 2 | 25 | 22 |

When one of the following conditions is triggered during monitoring of the SS sets corresponding to group #1, the UE may stop monitoring group #1 and start monitoring group #0 after $P_{switch}$ symbols from the earliest triggering time:

The end boundary of the slot in which the timer expires;
The last symbol boundary of the remaining Channel Occupancy (CO) period indicated from DCI format 2_0.

Here, when FBE is additionally configured, the following condition may be added to stop monitoring group #1 and start monitoring group #0 at the start of the FFP:

$P_{switch}$ symbols before the start of the next FFP.

In other words, when at least one of the following conditions is triggered during monitoring of the SS sets corresponding to group #1, the UE may stop monitoring group #1 and start monitoring group #0 after $P_{switch}$ symbols from the earliest triggering time:

The end boundary of the slot in which the timer expires;
The last symbol boundary of the remaining CO period indicated from DCI format 2_0;
$P_{switch}$ symbols before the start of the next FFP.

Here, the FFP may be configured with a periodicity of Tx in every 2 frames (e.g., 20 ms). Tx may be one of 1/2/2.5/4/5/10 ms, and may be configured by higher layer (e.g., RRC) signaling. For example, when Tx is set to 5 ms, 4 FFPs are configured with a periodicity of 5 ms in every 2 frames.

The proposal may be added as a new condition to Table 5. In addition, the values of P1/P2 in the proposal of the present disclosure and Table 5 may be replaced with $P_{switch}$ of the present method.

[Method #6] When multiple BWPs are configured for cell #1 belonging to a CGR, no group index value may be set for any SS set(s) configured in BWP #1, and group index value(s) may be set for some (or all) of the SS sets configured in BWP #2. In this regard, when BWP switching is performed from BWP #1 to BWP #2, a proposal is made regarding whether the UE should perform PDCCH monitoring on SS sets corresponding to a group index among the SS sets configured in BWP #2. Specifically, when the UE is performing PDCCH monitoring on SS sets corresponding to a specific group index for cell(s) belonging to the CGR, other than cell #1, it may perform BWP switching to BWP #2 of cell #1, and then perform PDCCH monitoring on SS sets corresponding to a corresponding group index even for cell #1. Alternatively, when the UE is not performing PDCCH monitoring on SS sets corresponding to a specific group index for all cell(s) belonging to the CGR other than cell #1, it may perform BWP switching to BWP #2 of cell #1, and then perform PDCCH monitoring on SS sets corresponding to group index 0 (or group index 1 or a preset specific group index) for cell #1.

For example, cell #1 and cell #2 may be configured to belong to the CGR. In this case, the UE may be performing PDCCH monitoring on SS sets corresponding to group #1 in slot #n for an active BWP in cell #2. In BWP #1 in cell #1, no group index may be set for any of the SS sets. In BWP #2, SS set #A may be configured as group #0 and SS set #B may be configured as group #1. When BWP switching to BWP #2 is indicated/configured by DCI (or timer expiration or RRC signaling) during operation of the UE in BWP #1, and thus the UE starts to operate in BWP #2 in slot #n, the UE may perform PDCCH monitoring on SS set #B corresponding to group #1 in slot #n for BWP #2 in cell #2, in consideration of the index of the group operating in cell #2.

As another example, cell #1 and cell #2 may be configured to belong to the CGR. In this case, for the active BWP in cell #2, no group index may be set for any SS sets.

No group index may be set for any SS sets in BWP #1 in cell #1. In BWP #2, SS set #A may be configured as group #0 and SS set #B may be configured as group #1. When BWP switching to BWP #2 is indicated/configured by DCI (or timer expiration or RRC signaling) during operation of the UE in BWP #1, and thus the UE starts to operate in BWP #2 in slot #n, the UE may perform PDCCH monitoring on SS set #A corresponding to group #0 (wherein the specific group index may be predefined or set by higher layer signaling) in slot #n for BWP #2 in cell #2, considering that there is no group index operating in all cells (i.e., cell #2) in the same CGR.

2) Transmitter (Entity B (e.g., BS)):

[Method #1A] Setting a reference time at which the first/second condition is triggered (or when switching is performed on the first slot (boundary) after at least P1/P2 symbols based on the first/second condition being triggered, configuring a reference symbol when P1=P2=0)

When the first (or second) condition is triggered due to the PDCCH detected in cell #1 in a CGR, the last symbol (e.g., symbol index N) for the PDCCH (or the CORESET including the PDCCH) on cell #1) may be defined as a reference time. When cell #1 and cell #2 belonging to the same CGR have the same numerology (e.g., SCS), the reference times may be aligned with the same symbol index (see FIG. 12). However, when the numerology differs between the cells (or BWPs) belonging to the same CGR, the reference times may not be aligned. Considering that configuring the same SS set switching time for the cells may reduce complexity in terms of the PDCCH monitoring operation of the UE, a rule needs to be established such that the reference times are aligned among the cells in the CGR.

As a method, a specific (e.g., first or last) symbol in cell #2 overlapping with symbol index N in cell #1 may be defined as a reference time for cell #2. As an example, when there are two symbols M and M+1 in 30 kHz SCS cell #2 coexisting (i.e., overlapping in time) with symbol n in 15 kHz SCS cell #1, the last symbol index, symbol #M+1, may be defined as the reference symbol for inter-cell alignment.

This method may be equally applied to determining a reference time for determining a PDCCH detection time when a timer operation starts due to PDCCH detection (which is one of the conditions for triggering the second condition). For example, when the last symbol in cell #1 for a certain PDCCH (transmitted in cell #1) (or a CORESET linked to the PDCCH) is symbol #N, the reference time for cell #1 may be symbol #N, and a specific (e.g., first or last) symbol in cell #2 overlapping with symbol #N in cell #1 may be defined as a reference time for cell #2. The timer operation may be started at the reference time.

[Method #2A] Determining the first slot (boundary) when switching is performed on the first slot (boundary) after at least P1/P2 symbols based on the first/second condition being triggered When the first (or second) condition is triggered, the BS may expect that PDCCH monitoring through an SS set associated with the switched group will be performed/started from the UE perspective on the first slot (boundary) following at least P1 (or P2) symbols (after the reference time). In the case where cell #1 and cell #2 belonging to the same CGR have the same numerology, the first slots (slot boundaries) may be aligned at the same time (see FIG. 12). Here, the numerology may include a symbol/slot duration and SCS, and reference may be made to Table 1. Referring to Table 1 and FIG. 2, the symbol/slot duration varies based on the SCS. Accordingly, when cells (or BWPs) belonging to the same CGR have different numerologies, the corresponding time points may not be aligned. FIG. 13 illustrates a case where the numerology differs between cells (or BWPs) belonging to a CGR. Referring to FIG. 13, it is assumed that the SCS of cell #1 is 2X kHz and the SCS of cell #2 is X kHz. In this case, the duration (or period) of the symbol/slot of cell #1 is configured to be shorter than the duration of the symbol/slot of cell #2. Accordingly, considering that configuring the same SS set switching time for the cells may reduce complexity in terms of the PDCCH monitoring operation of the UE, a rule needs to be established such that the times are aligned among the cells in the CGR.

Opt1: The first slot (boundary) after at least P1/P2 symbols may be determined based on a specific cell in the CGR, and the corresponding time may be applied to other cells in common. The specific cell may be determined by the cell index (e.g., the least or greatest cell index), determined by the cell (representative) numerology (e.g., smallest SCS or largest SCS), configured by higher layer (e.g., RRC) signaling, or determined as a cell in which a specific PDCCH related to the second condition is transmitted, or determined as a cell configured with the same numerology as the reference numerology of the value of P1 or P2.

For example, referring to FIG. 14, 15 kHz SCS cell #1 may be configured/determined as a reference cell (i.e., the smallest SCS), and the first slot (boundary) (e.g., slot index K) after at least P1 or P2 symbols may be determined based on the numerology corresponding to 15 kHz SCS. That is, whether the time corresponding to P1 or P2 symbols has elapsed may be determined based on the 15 kHz SCS-based symbol duration. In this case, when slots #L and #L+1 in 30 kHz SCS cell #2 overlap with slot index K in 15 kHz SCS cell #1, a specific one (e.g., slot index L or slot index L+1) of the slots It may be determined as the first slot (boundary) in cell #2. As another example, 30 kHz SCS cell #2 may be configured/determined as a reference cell (i.e., the largest SCS), and the first slot (boundary) (e.g., slot index K) after at least P1 or P2 symbols may be determined based thereon. In this case, slot index L in 15 kHz SCS cell #1 overlapping with slot index K in 30 kHz SCS cell #2 may be determined as the first slot (boundary) in cell #1. Here, the values of P1 and/or P2 may be set differently for each numerology, as described in Opt2. For example, the values of P1 and/or P2 may be replaced with the value of $P_{switch}$ shown in Table 6.

Opt2: The first slot (boundary) after at least P1/P2 symbols may be individually calculated for each cell in the CGR, and a representative time may be determined based on a specific cell/numerology among the cells. The specific cell/numerology may be determined by the cell index (e.g., the least or greatest cell index), determined by the cell (representative) numerology (e.g., smallest SCS or largest SCS), configured by higher layer (e.g., RRC) signaling, determined as a cell/numerology in which a specific PDCCH related to the second condition is transmitted, or determined as a cell/numerology followed (or preceded) by the calculated slot (boundary). For example, for 15 kHz SCS cell #1, the first slot (boundary) (e.g., slot index K) after at least P1/P2 symbols may be calculated. For 30 kHz SCS cell #1, the first slot (boundary) (e.g., slot index L) after at least P1/P2 symbols (wherein the values of P1 and/or P2 may differ among numerologies). In this case, when 15 kHz SCS cell #1 is configured/determined as a reference cell, and slots #T and #T+1 in 30 kHz SCS cell #2 overlap with slot index K in 15 kHz SCS cell #1, a specific slot (e.g., slot index T or slot index T+1) may be determined as the first slot (boundary) in cell #2. Alternatively, when 30 kHz SCS cell #2 is configured/determined as the reference cell, a slot in 15 kHz SCS cell #1 overlapping with slot index L in 30 kHz SCS cell #2 may be determined as the first slot (boundary).

[Method #3A] Setting a timer value corresponding to one of the second conditions Considering that numerology may differ among cells (or BWPs) in the CGR, a separate timer value may be set for each cell (or BWP) or numerology by higher layer (e.g., RRC) signaling. However, considering that configuring the same SS set switching time for the cells (or BWPs) in the CGR may reduce complexity in terms of the PDCCH monitoring operation of the UE, a common timer value may be set even when the numerology differs between the cells (or BWP). Accordingly, the timer value may be set independently of the SCS (in a time unit such as, for example, ms), or may be set based on representative numerology (e.g., the number of slots/symbols based on 15 kHz; the number of slots/symbols based on the smallest or largest SCS in the CGR; or the number of slots/symbols based on the numerology of a specific representative cell). When the timer value is set based on the representative numerology, the value of the timer may be changed (e.g., decremented by 1) on a slot basis as in the existing cases, and the timer may be operated based on the slot duration corresponding to the SCS.

[Method #4A] In consideration of the UE processing complexity involved when numerology differs between cells (or BWPs), the BS may be limited to always configure the same numerology for the cells (or BWPs) belonging to a CGR.

[Method #5A] For a cell in which FBE is configured (or a CGR including the cell in which FBE is configured), a rule may be defined to start monitoring group #0 at the start of every FFP.

As shown in Table 6, the UE is configured to report the capability it has for the minimum $P_{switch}$ value for each SCS. When a specific capability is not reported, it means that the UE supports capability 1. Reporting the specific capability means that the UE supports capability 2. In this regard, the BS may set a value greater than or equal to the minimum $P_{switch}$ value corresponding to the UE capability for the UE through higher layer (e.g., RRC) signaling.

When one of the following conditions is triggered while the UE is monitoring the SS sets corresponding to group #1, the BS may expect that monitoring of group #1 by the UE will be stopped and monitoring of group #0 by the UE will be started after $P_{switch}$ symbols from the earliest triggering time:

The end boundary of the slot in which the timer expires;
The last symbol boundary of the remaining Channel Occupancy (CO) period indicated from DCI format 2_0.

Here, when FBE is additionally configured, the following condition may be added to stop monitoring group #1 and start monitoring group #0 at the start of the FFP.

$P_{switch}$ symbols before the start of the next FFP

In other words, when at least one of the following conditions is triggered while the UE is monitoring the SS sets corresponding to group #1, the BS may expect that monitoring of group #1 by the UE will be stopped and monitoring of group #0 by the UE will be started after $P_{switch}$ symbols from the earliest triggering time:

The end boundary of the slot in which the timer expires;
The last symbol boundary of the remaining CO period indicated from DCI format 2_0;
$P_{switch}$ symbols before the start of the next FFP.

Here, the FFP may be configured with a periodicity of Tx in every 2 frames (e.g., 20 ms). Tx may be one of 1/2/2.5/

4/5/10 ms, and may be configured by higher layer (e.g., RRC) signaling. For example, when Tx is set to 5 ms, 4 FFPs are configured with a periodicity of 5 ms in every 2 frames.

The proposal may be added as a new condition to Table 5. In addition, the values of P1/P2 in the proposal of the present disclosure and Table 5 may be replaced with $P_{switch}$ of the present method.

[Method #6A] When multiple BWPs are configured for cell #1 belonging to a CGR, no group index value may be set for any SS set(s) configured in BWP #1, and group index value(s) may be set for some (or all) of the SS sets configured in BWP #2. In this regard, when BWP switching is performed from BWP #1 to BWP #2, a proposal is made regarding whether the UE should perform PDCCH monitoring on SS sets corresponding to a group index among the SS sets configured in BWP #2. Specifically, when the UE is performing PDCCH monitoring on SS sets corresponding to a specific group index for cell(s) belonging to the CGR, other than cell #1, the BS may expect that the UE will perform BWP switching to BWP #2 of cell #1, and then perform PDCCH monitoring on SS sets corresponding to a corresponding group index even for cell #1. Alternatively, when the UE is not performing PDCCH monitoring on SS sets corresponding to a specific group index for all cell(s) belonging to the CGR other than cell #1, the BS may expect that the UE will perform BWP switching to BWP#2 of cell #1, and then perform PDCCH monitoring on SS sets corresponding to group index 0 (or group index 1 or a preset specific group index) for cell #1.

For example, cell #1 and cell #2 may be configured to belong to the CGR. In this case, the BS may expect that the UE is performing PDCCH monitoring on SS sets corresponding to group #1 in slot #n for an active BWP in cell #2. In BWP #1 in cell #1, no group index may be set for any of the SS sets. In BWP #2, SS set #A may be configured as group #0 and SS set #B may be configured as group #1. When BWP switching to BWP #2 is indicated/configured by DCI (or timer expiration or RRC signaling) during operation of the UE in BWP #1, and thus the UE starts to operate in BWP #2 in slot #n, the UE may perform PDCCH monitoring on SS set #B corresponding to group #1 in slot #n for BWP #2 in cell #2, in consideration of the index of the group operating in cell #2.

As another example, cell #1 and cell #2 may be configured to belong to the CGR. In this case, for the active BWP in cell #2, no group index may be set for any SS sets. No group index may be set for any SS sets in BWP #1 in cell #1. In BWP #2, SS set #A may be configured as group #0 and SS set #B may be configured as group #1. When BWP switching to BWP #2 is indicated/configured by DCI (or timer expiration or RRC signaling) during operation of the UE in BWP #1, and thus the UE starts to operate in BWP #2 in slot #n, the UE may perform PDCCH monitoring on SS set #A corresponding to group #0 (wherein the specific group index may be predefined or set by higher layer signaling) in slot #n for BWP #2 in cell #2, considering that there is no group index operating in all cells (i.e., cell #2) in the same CGR.

3) Receiver & Transmitter (Between Receiver and Transmitter)

FIG. 15 illustrates a PDCCH monitoring operation according to an example of the present disclosure. Referring to FIG. 15, a BS may transmit a plurality of pieces of SS set configuration information to a UE (S1502). Here, the SS set configuration information may be provided for each BWP. For a detailed example of the SS set configuration information, reference may be made to the details described with reference to FIG. 5. The BS may transmit the SS set group configuration information to the UE (S1502). The SS set group configuration information may include information for additionally setting a group index to indicate an SS set group (hereinafter, group) to which each SS set belongs. The BS may also transmit, to the UE, configuration information about a cell group (CGR) in which an SS switching operation may be applied in common (S1502). Thereafter, the BS may directly informs the UE of a group to which switching is to be performed (e.g., the first/second condition for switching) (S1504). Alternatively, the UE may perform switching commonly/simultaneously for cells belonging to the same CGR when a specific condition is triggered, (S1506). Thereafter, the UE may perform PDCCH monitoring on the SS set corresponding to the switched group (S1508). According to the PDCCH monitoring result, the UE may receive the PDCCH and perform an operation accordingly. For example, when the PDCCH includes scheduling information, the UE may receive a PDSCH or transmit a PUSCH based on the PDCCH.

Here, in order to perform group switching on cells belonging to the CGR, various methods proposed in the present disclosure (Methods #1 to #6/#1A to #6A) may be used. For simplicity, each of the methods has been described separately, but they may be combined as long as they do not contradict/conflict with each other.

For example, Opt1 of method #2 proposes a timing for performing SS switching when a switching condition is satisfied. Specifically, the first slot that follows at least P1/P2 symbols after a reference time may be defined as the SS switching time, and the P1/P2 symbols may be determined based on cell (representative) numerology (e.g., the smallest SCS). For example, the cell (representative) numerology may include a symbol duration that is based on the smallest SCS in the CGR. In addition, P1/P2 may be replaced with the $P_{switch}$ of method #5, and the value thereof may vary among SCSs. In addition, as for the timer used to determine the switching condition, a common timer value may be set even when the numerology differs between the cells (or BWPs) according to method #3. For example, the timer may be configured to operate based on the representative numerology (e.g., the number of slots/symbols based on the smallest SCS in the CGR). Other methods may be combined in a similar manner.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 16 illustrates a communication system 1 applied to the present disclosure.

Referring to FIG. 16, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/ 5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

FIG. 17 illustrates wireless devices applicable to the present disclosure.

Referring to FIG. 17, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

FIG. 18 illustrates another example of a wireless device applied to the present disclosure. The wireless device may be implemented in various forms according to a use case/service (refer to FIG. 17).

Referring to FIG. 18, wireless devices 100 and 200 may correspond to the wireless devices 100 and 200 of FIG. 18 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcasting terminal, a hologram device, a public safety device, an MTC device, a medical device, a FinTech device (or a finance device), a security device, a climate/environment device, the AI server/device (400 of FIG. 17), the BSs (200 of FIG. 17), a network node, or the like. The wireless device may be mobile or fixed according to a use case/service.

In FIG. 18, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

FIG. 19 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 19, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be used for a UE, a BS, or other equipment in a wireless mobile communication system.

What is claimed is:

1. A method of performing communication by a user equipment (UE) in a wireless communication system, the method comprising:
    detecting a downlink control information (DCI) format that includes a search space (SS) set group switching flag value for a cell included in a cell group configured for an SS set group switching operation; and
    starting physical downlink control channel (PDCCH) monitoring according to SS sets of a first SS set group and stopping PDCCH monitoring the first PDCCH in the SS sets of the first group and starting monitoring according to SS sets of a second SS set group, for cells in the cell group, at a first slot that is at least P symbols after a last symbol of a PDCCH carrying the DCI format,
    wherein the P symbols is determined for the cell group based on a smallest subcarrier spacing (SCS) among a plurality of SCSs of configured bandwidth parts (BWPs) in the cell group.

2. The method of claim 1,
    wherein a boundary of the first slot is determined based on the smallest SCS among the plurality of SCSs.

3. A user equipment (UE) used in a wireless communication system, the UE comprising:
    at least one transceiver;
    at least one processor; and
    at least one computer memory operatively coupled to the at least one processor and configured to cause, when executed, the at least one processor to perform operations, the operations comprising:
    detecting a downlink control information (DCI) format that includes a search space (SS) set group switching flag value for a cell included in a cell group configured for an SS set group switching operation; and
    starting physical downlink control channel (PDCCH) monitoring according to SS sets of a first SS set group and stopping PDCCH monitoring the first PDCCH in the SS sets of the first group and starting monitoring according to SS sets of a second SS set group, for cells in the cell group, at a first slot that is at least P symbols after a last symbol of a PDCCH carrying the DCI format,
    wherein the P symbols is determined for the cell group based on a smallest subcarrier spacing (SCS) among a plurality of SCSs of configured bandwidth parts (BWPs) in the cell group.

4. The UE of claim 3,
    wherein a boundary of the first slot is determined based on the smallest SCS among the plurality of SCSs.

5. A base station (BS) used in a wireless communication system, comprising:
    at least one transceiver;
    at least one processor; and
    at least one computer memory operatively coupled to the at least one processor and configured to cause, when executed, the at least one processor to perform operations, the operations comprising:
    transmitting a downlink control information (DCI) format that includes a search space (SS) set group switching flag value for a cell included in a cell group configured for an SS set group switching operation; and
    starting transmitting physical downlink control channel (PDCCH) according to SS sets of a first SS set group and stopping transmitting PDCCH according to SS sets of a second SS set group, for cells in the cell group, at a first slot that is at least P symbols after a last symbol of a PDCCH carrying the DCI format,
    wherein the P symbols is determined for the cell group based on a smallest subcarrier spacing (SCS) among a plurality of SCSs of configured bandwidth parts (BWPs) in the cell group.

6. The BS of claim 5,
    wherein a boundary of the first slot is determined based on the smallest SCS among the plurality of SCSs.

* * * * *

UNITED STATES PATENT AND TRADEMARK OFFICE
CERTIFICATE OF CORRECTION

| | |
|---|---|
| PATENT NO. | : 11,956,657 B2 |
| APPLICATION NO. | : 17/806584 |
| DATED | : April 9, 2024 |
| INVENTOR(S) | : Seonwook Kim et al. |

Page 1 of 1

It is certified that error appears in the above-identified patent and that said Letters Patent is hereby corrected as shown below:

In the Claims

In Column 31, Lines 21-22:
Delete "the first PDCCH in the SS sets of the first group and starting monitoring"

Signed and Sealed this
Tenth Day of December, 2024

Katherine Kelly Vidal
*Director of the United States Patent and Trademark Office*